(12) United States Patent
Azmoon

(10) Patent No.: US 11,176,331 B2
(45) Date of Patent: *Nov. 16, 2021

(54) CONTEXTUAL COMMUNICATION AND SERVICE INTERFACE

(71) Applicant: ServiceNow, Inc., Santa Clara, CA (US)

(72) Inventor: Troy Azmoon, Carlsbad, CA (US)

(73) Assignee: ServiceNow, Inc., Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/989,275

(22) Filed: Aug. 10, 2020

(65) Prior Publication Data

US 2020/0372224 A1    Nov. 26, 2020

Related U.S. Application Data

(63) Continuation of application No. 15/879,259, filed on Jan. 24, 2018, now Pat. No. 10,740,568.

(51) Int. Cl.
| | |
|---|---|
| *G06F 40/35* | (2020.01) |
| *H04M 3/51* | (2006.01) |
| *G06Q 30/00* | (2012.01) |
| *G06F 3/0481* | (2013.01) |
| *G06Q 10/10* | (2012.01) |

(Continued)

(52) U.S. Cl.
CPC ............ *G06F 40/35* (2020.01); *G06F 3/0481* (2013.01); *G06F 3/0482* (2013.01); *G06F 40/186* (2020.01); *G06N 20/00* (2019.01); *G06Q 10/10* (2013.01); *G06Q 10/20* (2013.01); *G06Q 30/016* (2013.01); *H04L 41/5074* (2013.01);

(Continued)

(58) Field of Classification Search
None
See application file for complete search history.

(56) References Cited

U.S. PATENT DOCUMENTS

| 6,609,122 B1 | 8/2003 | Ensor |
| 7,028,301 B2 | 4/2006 | Ding |

(Continued)

OTHER PUBLICATIONS

Zendesk Chat Features, Printed Jan. 24, 2018 from https://www.zendesk.com/chat/features/#features.

*Primary Examiner* — Ryan Barrett
(74) *Attorney, Agent, or Firm* — Fletcher Yoder PC

(57) ABSTRACT

An example embodiment may involve obtaining an incident record relating to a user. The embodiment may also involve generating and providing, for display on a graphical user interface, a single window including a dialog region, an incident record region, and a suggestion region. The embodiment may also involve determining candidate messages by incorporating components of the incident record into predetermined message templates. The embodiment may also involve determining a scoring for the candidate messages based on a relevance to a conversation between the user and an agent. The embodiment may also involve based on the scoring, selecting one or more of the candidate messages to include in a set of suggested messages displayed in the suggestion region. The embodiment may also involve receiving input from the agent selecting one of the suggested messages, and then responsively displaying the selected suggested message as part of the conversation in the dialog region.

19 Claims, 14 Drawing Sheets

(51) Int. Cl.
*H04L 12/24* (2006.01)
*G06Q 10/00* (2012.01)
*G06F 40/186* (2020.01)
*G06F 3/0482* (2013.01)
*G06N 20/00* (2019.01)
*G06F 3/0486* (2013.01)

(52) U.S. Cl.
CPC ......... *H04M 3/5133* (2013.01); *G06F 3/0486* (2013.01); *H04L 41/22* (2013.01)

(56) References Cited

U.S. PATENT DOCUMENTS

| | | | |
|---|---|---|---|
| 7,062,683 B2 | 6/2006 | Warpenburg |
| 7,131,037 B1 | 10/2006 | LeFaive |
| 7,170,864 B2 | 1/2007 | Matharu |
| 7,350,209 B2 | 3/2008 | Shum |
| 7,610,512 B2 | 10/2009 | Gerber |
| 7,617,073 B2 | 11/2009 | Trinon |
| 7,689,628 B2 | 3/2010 | Garg |
| 7,783,744 B2 | 8/2010 | Garg |
| 7,890,802 B2 | 2/2011 | Gerber |
| 7,930,396 B2 | 4/2011 | Trinon |
| 7,945,860 B2 | 5/2011 | Vambenepe |
| 7,966,398 B2 | 6/2011 | Wiles |
| 8,051,164 B2 | 11/2011 | Peuter |
| 8,224,683 B2 | 7/2012 | Manos |
| 8,266,096 B2 | 9/2012 | Navarrete |
| 8,457,928 B2 | 6/2013 | Dang |
| 8,578,569 B1 | 7/2013 | Scarpelli |
| 8,626,675 B1 | 1/2014 | Satish |
| 8,674,992 B2 | 3/2014 | Poston |
| 8,689,241 B2 | 4/2014 | Naik |
| 8,743,121 B2 | 6/2014 | De Peuter |
| 8,887,133 B2 | 11/2014 | Behnia |
| 9,239,857 B2 | 1/2016 | Trinon |
| 9,406,075 B1 * | 8/2016 | Bansal ............... G06Q 30/0282 |
| 9,535,737 B2 | 1/2017 | Joy |
| 9,557,969 B2 | 1/2017 | Sharma |
| 9,647,968 B2 | 5/2017 | Smullen et al. |
| 9,792,387 B2 | 10/2017 | George |
| 10,198,698 B2 | 2/2019 | Jayaraman |
| 10,235,639 B1 | 3/2019 | Mandel et al. |
| 10,387,787 B1 * | 8/2019 | Cessna ..................... G06N 5/02 |
| 10,459,962 B1 | 10/2019 | Jayaraman et al. |
| 2003/0088533 A1 | 5/2003 | Fortenberry et al. |
| 2007/0300159 A1 | 12/2007 | Kordun |
| 2011/0282817 A1 | 11/2011 | Nemecek et al. |
| 2011/0289406 A1 | 11/2011 | Wassingbo |
| 2012/0259891 A1 | 10/2012 | Edoja |
| 2015/0074578 A1 | 3/2015 | Liang et al. |
| 2015/0088998 A1 | 3/2015 | Isensee et al. |
| 2015/0331606 A1 | 11/2015 | Shen et al. |
| 2015/0331853 A1 | 11/2015 | Palmonari et al. |
| 2017/0048170 A1 | 2/2017 | Smullen et al. |
| 2017/0093774 A1 | 3/2017 | Arastafar |
| 2017/0140563 A1 | 5/2017 | No et al. |
| 2017/0222956 A1 | 8/2017 | Jain et al. |
| 2017/0372231 A1 * | 12/2017 | Ghatage ............ G06Q 10/0631 |
| 2018/0012232 A1 | 1/2018 | Sehrawal et al. |
| 2018/0018581 A1 * | 1/2018 | Cook ..................... H04L 67/20 |
| 2018/0018684 A1 | 1/2018 | Orr et al. |
| 2018/0061256 A1 | 3/2018 | Eichik et al. |
| 2018/0357282 A1 | 12/2018 | Ambartsumov et al. |

\* cited by examiner

CONTEXTUAL COMMUNICATION AND SERVICE INTERFACE

CROSS-REFERENCE TO RELATED APPLICATION

This application is a continuation of U.S. patent application Ser. No. 15/879,259, entitled "CONTEXTUAL COMMUNICATION AND SERVICE INTERFACE," filed Jan. 24, 2018, which is herein incorporated by reference in its entirety for all purposes.

BACKGROUND

Enterprise software systems may be used to implement operational processes for an enterprise, and may typically take the form of software applications. Such applications may include a desktop or web-based application developed for usage by internal users (e.g., employees of the enterprise), as well as for external users such as customers that engage in transactions with the enterprise. One such application may enable an agent, such as a customer service agent or information technology agent, to engage in a conversation with an internal or external user in an attempt to resolve an issue, or "incident," for the user. This application might provide the agent with a complex interface or other mechanisms that may impede the agent's ability to meet the user's needs and resolve the incident.

For example, the interface may require the agent to open multiple graphical user interface (GUI) windows, such as one window that enables the agent to converse with the user, and another, separate window that enables the agent to view a record associated with the current incident. As another example, the record may be lengthy and/or may contain complex information, and thus the agent might spend an undesirable amount of time looking up relevant information in the record. Further, the application may cause the agent to spend an undesirable amount of time inputting lengthy portions of information and/or repeatedly copy/pasting information from one window to another.

SUMMARY

The embodiments herein improve upon the enterprise systems discussed above and provide systems and corresponding methods for facilitating streamlined assistance to users. Such an approach may help the agent quickly and efficiently meet the user's needs and resolve the incident, perhaps without the agent needing to navigate a complex interface and/or spend excessive time entering and looking up information.

In accordance with the present disclosure, a user assistance system may provide an interface comprising a single window in which the agent may engage in a conversation with the user about an incident, as well as view an incident record for the incident. In addition, the user assistance system may be configured to cause relevant information from the incident record to be made readily available for use by the agent to add to the conversation. For example, the user assistance system may analyze the incident record and/or the conversation between the agent and the user, identify relevant information, and generate a set of one or more messages for the agent to add to the conversation. Further, in some embodiments, the user assistance system may be configured to analyze the conversation as a basis for dynamically updating the incident record.

Accordingly, a first example embodiment may involve obtaining, from a database, an incident record relating to a user. The user may be associated with a managed network that is remotely managed by a remote network management platform. The first example embodiment may also involve generating and providing, for display on a graphical user interface, a single window of the graphical user interface. The single window may include a dialog region, an incident record region, and a suggestion region. The dialog region may include a first location for displaying a conversation between the user and an agent, and a second location for entering a message to be added to the conversation. The incident record region may include the incident record, where components of the incident record contain at least one of an identifier of the user, an incident status, and an incident description. The suggestion region may be for displaying a set of suggested messages for use by the agent to add to the conversation.

The first example embodiment may also involve determining a plurality of candidate messages by incorporating the components of the incident record into predetermined message templates. The predetermined message templates may include sentence fragments and define fields in which to incorporate the components. The first example embodiment may also involve determining a scoring for the plurality of candidate messages based on a relevance to messages from the conversation. The first example embodiment may also involve, based on the scoring, selecting one or more of the plurality of candidate messages to include in the set of suggested messages displayed in the suggestion region. The first example embodiment may also involve receiving, by way of the graphical user interface, input from the agent selecting one of the set of suggested messages to be added to the conversation. And the first example embodiment may also involve, in response to receiving the input, providing, for display on the graphical user interface, the selected suggested message as part of the conversation in the first location of the dialog region.

In a second example embodiment, an article of manufacture may include a non-transitory computer-readable medium, having stored thereon program instructions that, upon execution by a computing system, cause the computing system to perform operations in accordance with the first example embodiment.

In a third example embodiment, a computing system may include at least one processor, as well as memory and program instructions. The program instructions may be stored in the memory, and upon execution by the at least one processor, cause the computing system to perform operations in accordance with the first example embodiment.

In a fourth example embodiment, a system may include various means for carrying out each of the operations of the first example embodiment.

These as well as other embodiments, aspects, advantages, and alternatives will become apparent to those of ordinary skill in the art by reading the following detailed description, with reference where appropriate to the accompanying drawings. Further, this summary and other descriptions and figures provided herein are intended to illustrate embodiments by way of example only and, as such, that numerous variations are possible. For instance, structural elements and process steps can be rearranged, combined, distributed, eliminated, or otherwise changed, while remaining within the scope of the embodiments as claimed.

DETAILED DESCRIPTION

Figure 1:
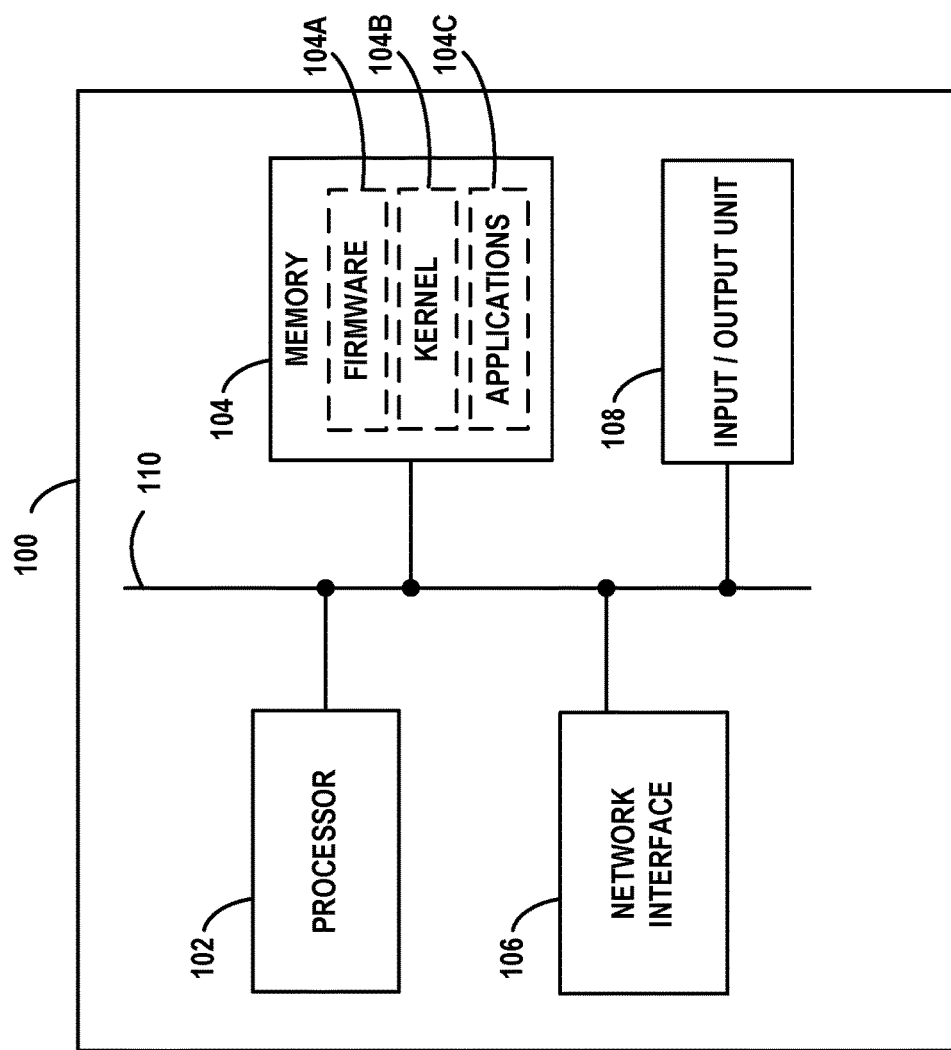
FIG. 1 illustrates a schematic drawing of a computing device, in accordance with example embodiments.

Example methods, devices, and systems are described herein. It should be understood that the words "example" and "exemplary" are used herein to mean "serving as an example, instance, or illustration." Any embodiment or feature described herein as being an "example" or "exemplary" is not necessarily to be construed as preferred or advantageous over other embodiments or features unless stated as such. Thus, other embodiments can be utilized and other changes can be made without departing from the scope of the subject matter presented herein.

Accordingly, the example embodiments described herein are not meant to be limiting. It will be readily understood that the aspects of the present disclosure, as generally described herein, and illustrated in the figures, can be arranged, substituted, combined, separated, and designed in a wide variety of different configurations. For example, the separation of features into "client" and "server" components may occur in a number of ways.

Further, unless context suggests otherwise, the features illustrated in each of the figures may be used in combination with one another. Thus, the figures should be generally viewed as component aspects of one or more overall embodiments, with the understanding that not all illustrated features are necessary for each embodiment.

Additionally, any enumeration of elements, blocks, or steps in this specification or the claims is for purposes of clarity. Thus, such enumeration should not be interpreted to require or imply that these elements, blocks, or steps adhere to a particular arrangement or are carried out in a particular order.

I. Introduction

A large enterprise is a complex entity with many interrelated operations. Some of these are found across the enterprise, such as human resources (HR), supply chain, information technology (IT), and finance. However, each enterprise also has its own unique operations that provide essential capabilities and/or create competitive advantages.

To support widely-implemented operations, enterprises typically use off-the-shelf software applications, such as customer relationship management (CRM) and human capital management (HCM) packages. However, they may also need custom software applications to meet their own unique requirements. A large enterprise often has dozens or hundreds of these custom software applications. Nonetheless, the advantages provided by the embodiments herein are not limited to large enterprises and may be applicable to an enterprise, or any other type of organization, of any size.

Many such software applications are developed by individual departments within the enterprise. These range from simple spreadsheets to custom-built software tools and databases. But the proliferation of siloed custom software applications has numerous disadvantages. It negatively impacts an enterprise's ability to run and grow its business, innovate, and meet regulatory requirements. The enterprise may find it difficult to integrate, streamline and enhance its operations due to lack of a single system that unifies its subsystems and data.

To efficiently create custom applications, enterprises would benefit from a remotely-hosted application platform that eliminates unnecessary development complexity. The goal of such a platform would be to reduce time-consuming, repetitive application development tasks so that software engineers and individuals in other roles can focus on developing unique, high-value features.

In order to achieve this goal, the concept of Application Platform as a Service (aPaaS) is introduced, to intelligently automate workflows throughout the enterprise. An aPaaS system is hosted remotely from the enterprise, but may access data, applications, and services within the enterprise by way of secure connections. Such an aPaaS system may have a number of advantageous capabilities and characteristics. These advantages and characteristics may be able to improve the enterprise's operations and workflow for IT, HR, CRM, customer service, application development, and security.

The aPaaS system may support development and execution of model-view-controller (MVC) applications. MVC applications divide their functionality into three interconnected parts (model, view, and controller) in order to isolate representations of information from the manner in which the information is presented to the user, thereby allowing for efficient code reuse and parallel development. These applications may be web-based, and offer create, read, update, delete (CRUD) capabilities. This allows new applications to be built on a common application infrastructure.

The aPaaS system may support standardized application components, such as a standardized set of widgets for graphical user interface (GUI) development. In this way, applications built using the aPaaS system have a common look and feel. Other software components and modules may be standardized as well. In some cases, this look and feel can be branded or skinned with an enterprise's custom logos and/or color schemes.

The aPaaS system may support the ability to configure the behavior of applications using metadata. This allows application behaviors to be rapidly adapted to meet specific needs. Such an approach reduces development time and increases flexibility. Further, the aPaaS system may support GUI tools that facilitate metadata creation and management, thus reducing errors in the metadata.

The aPaaS system may support clearly-defined interfaces between applications, so that software developers can avoid unwanted inter-application dependencies. Thus, the aPaaS system may implement a service layer in which persistent state information and other data is stored.

The aPaaS system may support a rich set of integration features so that the applications thereon can interact with legacy applications and third-party applications. For instance, the aPaaS system may support a custom employee-onboarding system that integrates with legacy HR, IT, and accounting systems.

The aPaaS system may support enterprise-grade security. Furthermore, since the aPaaS system may be remotely hosted, it should also utilize security procedures when it interacts with systems in the enterprise or third-party networks and services hosted outside of the enterprise. For example, the aPaaS system may be configured to share data amongst the enterprise and other parties to detect and identify common security threats.

Other features, functionality, and advantages of an aPaaS system may exist. This description is for purpose of example and is not intended to be limiting.

As an example of the aPaaS development process, a software developer may be tasked to create a new application using the aPaaS system. First, the developer may define the data model, which specifies the types of data that the application uses and the relationships therebetween. Then, via a GUI of the aPaaS system, the developer enters (e.g., uploads) the data model. The aPaaS system automatically creates all of the corresponding database tables, fields, and relationships, which can then be accessed via an object-oriented services layer.

In addition, the aPaaS system can also build a fully-functional MVC application with client-side interfaces and server-side CRUD logic. This generated application may serve as the basis of further development for the user. Advantageously, the developer does not have to spend a large amount of time on basic application functionality. Further, since the application may be web-based, it can be accessed from any Internet-enabled client device. Alternatively or additionally, a local copy of the application may be able to be accessed, for instance, when Internet service is not available.

The aPaaS system may also support a rich set of pre-defined functionality that can be added to applications. These features include support for searching, email, templating, workflow design, reporting, analytics, social media, scripting, mobile-friendly output, and customized GUIs.

The following embodiments describe architectural and functional aspects of example aPaaS systems, as well as the features and advantages thereof.

II. Example Computing Devices and Cloud-Based Computing Environments

FIG. 1 is a simplified block diagram exemplifying a computing device 100, illustrating some of the components that could be included in a computing device arranged to operate in accordance with the embodiments herein. Computing device 100 could be a client device (e.g., a device actively operated by a user), a server device (e.g., a device that provides computational services to client devices), or some other type of computational platform. Some server devices may operate as client devices from time to time in order to perform particular operations, and some client devices may incorporate server features.

In this example, computing device 100 includes processor 102, memory 104, network interface 106, and an input/output unit 108, all of which may be coupled by a system bus 110 or a similar mechanism. In some embodiments, computing device 100 may include other components and/or peripheral devices (e.g., detachable storage, printers, and so on).

Processor 102 may be one or more of any type of computer processing element, such as a central processing unit (CPU), a co-processor (e.g., a mathematics, graphics, or encryption co-processor), a digital signal processor (DSP), a network processor, and/or a form of integrated circuit or controller that performs processor operations. In some cases, processor 102 may be one or more single-core processors. In other cases, processor 102 may be one or more multi-core processors with multiple independent processing units. Processor 102 may also include register memory for temporarily storing instructions being executed and related data, as well as cache memory for temporarily storing recently-used instructions and data.

Memory 104 may be any form of computer-usable memory, including but not limited to random access memory (RAM), read-only memory (ROM), and non-volatile memory (e.g., flash memory, hard disk drives, solid state drives, compact discs (CDs), digital video discs (DVDs), and/or tape storage). Thus, memory 104 represents both main memory units, as well as long-term storage. Other types of memory may include biological memory.

Memory 104 may store program instructions and/or data on which program instructions may operate. By way of example, memory 104 may store these program instructions on a non-transitory, computer-readable medium, such that the instructions are executable by processor 102 to carry out any of the methods, processes, or operations disclosed in this specification or the accompanying drawings.

As shown in FIG. 1, memory 104 may include firmware 104A, kernel 104B, and/or applications 104C. Firmware 104A may be program code used to boot or otherwise initiate some or all of computing device 100. Kernel 104B may be an operating system, including modules for memory management, scheduling and management of processes, input/output, and communication. Kernel 104B may also include device drivers that allow the operating system to communicate with the hardware modules (e.g., memory units, networking interfaces, ports, and busses), of computing device 100. Applications 104C may be one or more user-space software programs, such as web browsers or email clients, as well as any software libraries used by these programs. Memory 104 may also store data used by these and other programs and applications.

Network interface 106 may take the form of one or more wireline interfaces, such as Ethernet (e.g., Fast Ethernet, Gigabit Ethernet, and so on). Network interface 106 may also support communication over one or more non-Ethernet media, such as coaxial cables or power lines, or over wide-area media, such as Synchronous Optical Networking (SONET) or digital subscriber line (DSL) technologies. Network interface 106 may additionally take the form of one or more wireless interfaces, such as IEEE 802.11 (Wifi), BLUETOOTH®, global positioning system (GPS), or a wide-area wireless interface. However, other forms of physical layer interfaces and other types of standard or proprietary communication protocols may be used over network interface 106. Furthermore, network interface 106 may comprise multiple physical interfaces. For instance, some embodiments of computing device 100 may include Ethernet, BLUETOOTH®, and Wifi interfaces.

Input/output unit 108 may facilitate user and peripheral device interaction with example computing device 100. Input/output unit 108 may include one or more types of input devices, such as a keyboard, a mouse, a touch screen, and so on. Similarly, input/output unit 108 may include one or more types of output devices, such as a screen, monitor, printer, and/or one or more light emitting diodes (LEDs). Additionally or alternatively, computing device 100 may communicate with other devices using a universal serial bus (USB) or high-definition multimedia interface (HDMI) port interface, for example.

In some embodiments, one or more instances of computing device 100 may be deployed to support an aPaaS architecture. The exact physical location, connectivity, and configuration of these computing devices may be unknown and/or unimportant to client devices. Accordingly, the computing devices may be referred to as "cloud-based" devices that may be housed at various remote data center locations.

Figure 2:
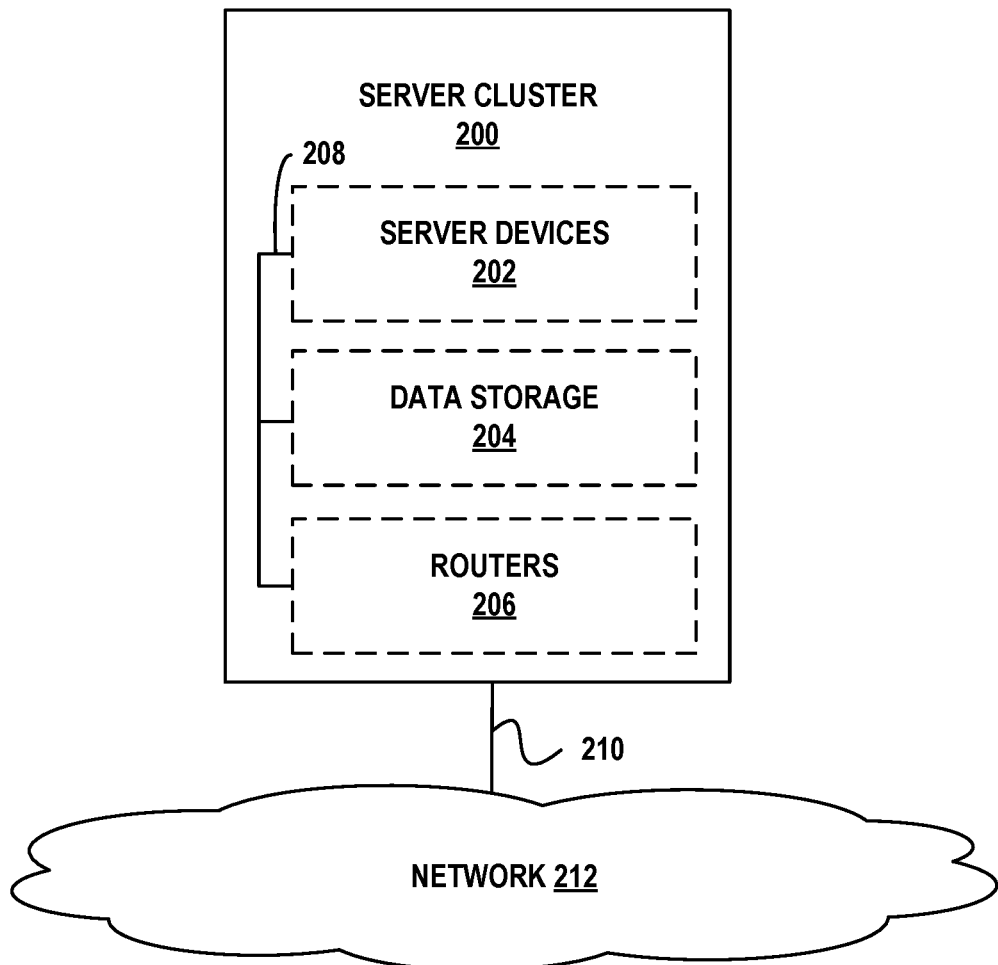
FIG. 2 illustrates a schematic drawing of a server device cluster, in accordance with example embodiments.

FIG. 2 depicts a cloud-based server cluster 200 in accordance with example embodiments. In FIG. 2, operations of a computing device (e.g., computing device 100) may be distributed between server devices 202, data storage 204, and routers 206, all of which may be connected by local cluster network 208. The number of server devices 202, data storages 204, and routers 206 in server cluster 200 may depend on the computing task(s) and/or applications assigned to server cluster 200.

For example, server devices 202 can be configured to perform various computing tasks of computing device 100. Thus, computing tasks can be distributed among one or more of server devices 202. To the extent that these computing tasks can be performed in parallel, such a distribution of tasks may reduce the total time to complete these tasks and return a result. For purpose of simplicity, both server cluster 200 and individual server devices 202 may be referred to as a "server device." This nomenclature should be understood to imply that one or more distinct server devices, data storage devices, and cluster routers may be involved in server device operations.

Data storage 204 may be data storage arrays that include drive array controllers configured to manage read and write access to groups of hard disk drives and/or solid state drives. The drive array controllers, alone or in conjunction with server devices 202, may also be configured to manage backup or redundant copies of the data stored in data storage 204 to protect against drive failures or other types of failures that prevent one or more of server devices 202 from accessing units of cluster data storage 204. Other types of memory aside from drives may be used.

Routers 206 may include networking equipment configured to provide internal and external communications for server cluster 200. For example, routers 206 may include one or more packet-switching and/or routing devices (including switches and/or gateways) configured to provide (i) network communications between server devices 202 and data storage 204 via cluster network 208, and/or (ii) network communications between the server cluster 200 and other devices via communication link 210 to network 212.

Additionally, the configuration of cluster routers 206 can be based at least in part on the data communication requirements of server devices 202 and data storage 204, the latency and throughput of the local cluster network 208, the latency, throughput, and cost of communication link 210, and/or other factors that may contribute to the cost, speed, fault-tolerance, resiliency, efficiency and/or other design goals of the system architecture.

As a possible example, data storage 204 may include any form of database, such as a structured query language (SQL) database. Various types of data structures may store the information in such a database, including but not limited to tables, arrays, lists, trees, and tuples. Furthermore, any databases in data storage 204 may be monolithic or distributed across multiple physical devices.

Server devices 202 may be configured to transmit data to and receive data from cluster data storage 204. This transmission and retrieval may take the form of SQL queries or other types of database queries, and the output of such queries, respectively. Additional text, images, video, and/or audio may be included as well. Furthermore, server devices 202 may organize the received data into web page representations. Such a representation may take the form of a markup language, such as the hypertext markup language (HTML), the extensible markup language (XML), or some other standardized or proprietary format. Moreover, server devices 202 may have the capability of executing various types of computerized scripting languages, such as but not limited to Perl, Python, PHP Hypertext Preprocessor (PHP), Active Server Pages (ASP), JavaScript, and so on. Computer program code written in these languages may facilitate the providing of web pages to client devices, as well as client device interaction with the web pages.

III. Example Remote Network Management Architecture

Figure 3:
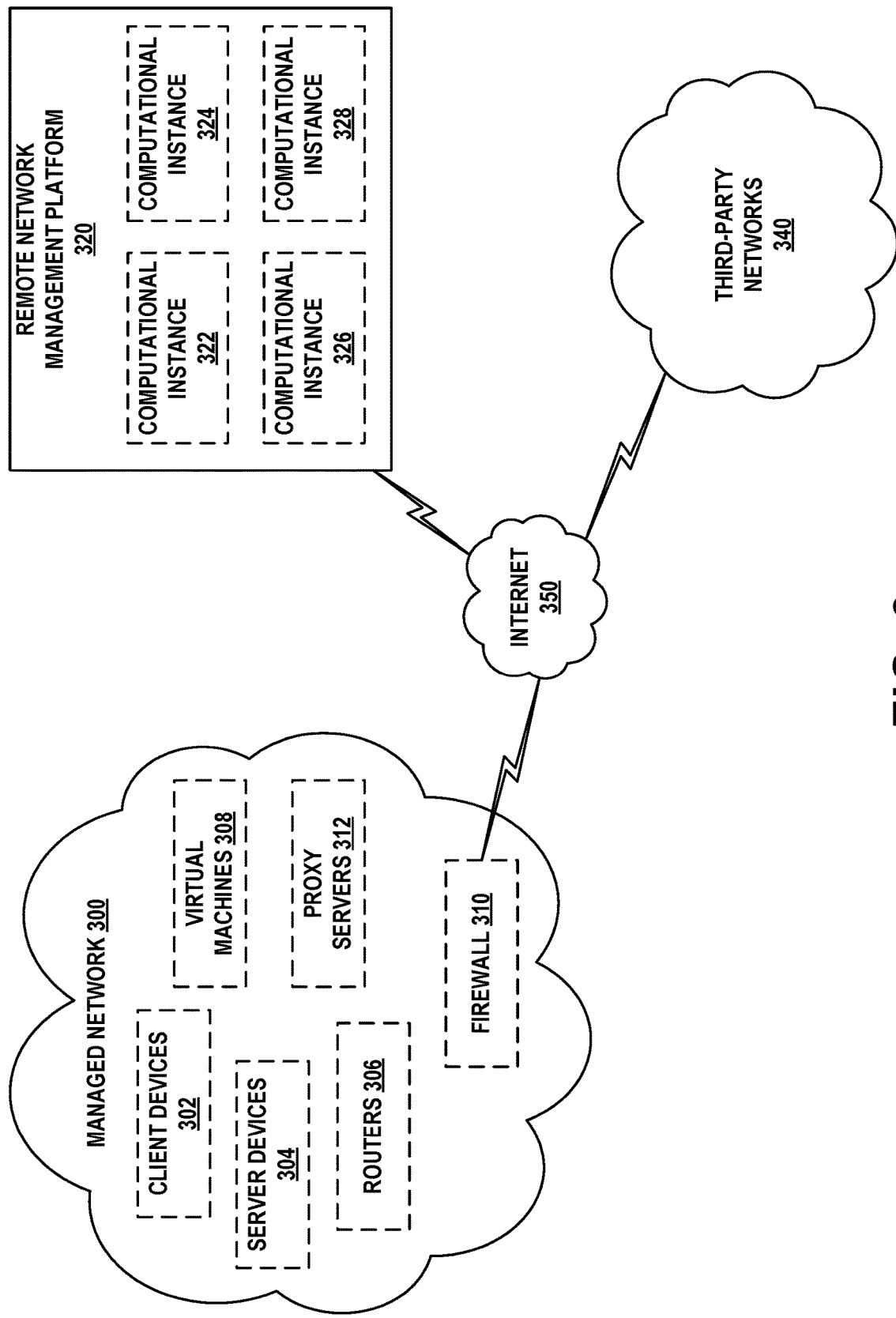
FIG. 3 depicts a remote network management architecture, in accordance with example embodiments.

FIG. 3 depicts a remote network management architecture, in accordance with example embodiments. This architecture includes three main components, managed network 300, remote network management platform 320, and third-party networks 340, all connected by way of Internet 350.

Managed network 300 may be, for example, an enterprise network used by a business for computing and communications tasks, as well as storage of data. Thus, managed network 300 may include various client devices 302, server devices 304, routers 306, virtual machines 308, firewall 310, and/or proxy servers 312. Client devices 302 may be embodied by computing device 100, server devices 304 may be embodied by computing device 100 or server cluster 200, and routers 306 may be any type of router, switch, or gateway.

Virtual machines 308 may be embodied by one or more of computing device 100 or server cluster 200. In general, a virtual machine is an emulation of a computing system, and mimics the functionality (e.g., processor, memory, and communication resources) of a physical computer. One physical computing system, such as server cluster 200, may support up to thousands of individual virtual machines. In some embodiments, virtual machines 308 may be managed by a centralized server device or application that facilitates allocation of physical computing resources to individual virtual machines, as well as performance and error reporting. Enterprises often employ virtual machines in order to allocate computing resources in an efficient, as needed fashion. Providers of virtualized computing systems include VMWARE® and MICROSOFT®.

Firewall 310 may be one or more specialized routers or server devices that protect managed network 300 from unauthorized attempts to access the devices, applications, and services therein, while allowing authorized communication that is initiated from managed network 300. Firewall 310 may also provide intrusion detection, web filtering, virus scanning, application-layer gateways, and other applications or services. In some embodiments not shown in FIG. 3, managed network 300 may include one or more virtual private network (VPN) gateways with which it communicates with remote network management platform 320 (see below).

Managed network 300 may also include one or more proxy servers 312. An embodiment of proxy servers 312 may be a server device that facilitates communication and movement of data between managed network 300, remote network management platform 320, and third-party networks 340. In particular, proxy servers 312 may be able to establish and maintain secure communication sessions with one or more computational instances of remote network management platform 320. By way of such a session, remote network management platform 320 may be able to discover and manage aspects of the architecture and configuration of managed network 300 and its components. Possibly with the assistance of proxy servers 312, remote network management platform 320 may also be able to discover and manage aspects of third-party networks 340 that are used by managed network 300.

Firewalls, such as firewall 310, typically deny all communication sessions that are incoming by way of Internet 350, unless such a session was ultimately initiated from behind the firewall (i.e., from a device on managed network 300) or the firewall has been explicitly configured to support the session. By placing proxy servers 312 behind firewall 310 (e.g., within managed network 300 and protected by firewall 310), proxy servers 312 may be able to initiate these communication sessions through firewall 310. Thus, firewall 310 might not have to be specifically configured to support incoming sessions from remote network management platform 320, thereby avoiding potential security risks to managed network 300.

In some cases, managed network 300 may consist of a few devices and a small number of networks. In other deployments, managed network 300 may span multiple physical locations and include hundreds of networks and hundreds of thousands of devices. Thus, the architecture depicted in FIG. 3 is capable of scaling up or down by orders of magnitude.

Furthermore, depending on the size, architecture, and connectivity of managed network 300, a varying number of proxy servers 312 may be deployed therein. For example, each one of proxy servers 312 may be responsible for communicating with remote network management platform 320 regarding a portion of managed network 300. Alternatively or additionally, sets of two or more proxy servers may be assigned to such a portion of managed network 300 for purposes of load balancing, redundancy, and/or high availability.

Remote network management platform 320 is a hosted environment that provides aPaaS services to users, particularly to the operators of managed network 300. These services may take the form of web-based portals, for instance. Thus, a user can securely access remote network management platform 320 from, for instance, client devices 302, or potentially from a client device outside of managed network 300. By way of the web-based portals, users may design, test, and deploy applications, generate reports, view analytics, and perform other tasks.

As shown in FIG. 3, remote network management platform 320 includes four computational instances 322, 324, 326, and 328. Each of these instances may represent a set of web portals, services, and applications (e.g., a wholly-functioning aPaaS system) available to a particular customer. In some cases, a single customer may use multiple computational instances. For example, managed network 300 may be an enterprise customer of remote network management platform 320, and may use computational instances 322, 324, and 326. The reason for providing multiple instances to one customer is that the customer may wish to independently develop, test, and deploy its applications and services. Thus, computational instance 322 may be dedicated to application development related to managed network 300, computational instance 324 may be dedicated to testing these applications, and computational instance 326 may be dedicated to the live operation of tested applications and services. A computational instance may also be referred to as a hosted instance, a remote instance, a customer instance, or by some other designation.

The multi-instance architecture of remote network management platform 320 is in contrast to conventional multi-tenant architectures, over which multi-instance architectures have several advantages. In multi-tenant architectures, data from different customers (e.g., enterprises) are commingled in a single database. While these customers' data are separate from one another, the separation is enforced by the software that operates the single database. As a consequence, a security breach in this system may impact all customers' data, creating additional risk, especially for entities subject to governmental, healthcare, and/or financial regulation. Furthermore, any database operations that impact one customer will likely impact all customers sharing that database. Thus, if there is an outage due to hardware or software errors, this outage affects all such customers. Likewise, if the database is to be upgraded to meet the needs of one customer, it will be unavailable to all customers during the upgrade process. Often, such maintenance windows will be long, due to the size of the shared database.

In contrast, the multi-instance architecture provides each customer with its own database in a dedicated computing instance. This prevents commingling of customer data, and allows each instance to be independently managed. For example, when one customer's instance experiences an outage due to errors or an upgrade, other computational instances are not impacted. Maintenance down time is limited because the database only contains one customer's data. Further, the simpler design of the multi-instance architecture allows redundant copies of each customer database and instance to be deployed in a geographically diverse fashion. This facilitates high availability, where the live version of the customer's instance can be moved when faults are detected or maintenance is being performed.

In order to support multiple computational instances in an efficient fashion, remote network management platform 320 may implement a plurality of these instances on a single hardware platform. For example, when the aPaaS system is implemented on a server cluster such as server cluster 200, it may operate a virtual machine that dedicates varying amounts of computational, storage, and communication resources to instances. But full virtualization of server cluster 200 might not be necessary, and other mechanisms may be used to separate instances. In some examples, each instance may have a dedicated account and one or more dedicated databases on server cluster 200. Alternatively, computational instance 322 may span multiple physical devices.

In some cases, a single server cluster of remote network management platform 320 may support multiple independent enterprises. Furthermore, as described below, remote network management platform 320 may include multiple server clusters deployed in geographically diverse data centers in order to facilitate load balancing, redundancy, and/or high availability.

Third-party networks 340 may be remote server devices (e.g., a plurality of server clusters such as server cluster 200) that can be used for outsourced computational, data storage, communication, and service hosting operations. These servers may be virtualized (i.e., the servers may be virtual machines). Examples of third-party networks 340 may include AMAZON WEB SERVICES® and MICROSOFT® Azure. Like remote network management platform 320, multiple server clusters supporting third-party networks 340 may be deployed at geographically diverse locations for purposes of load balancing, redundancy, and/or high availability.

Managed network 300 may use one or more of third-party networks 340 to deploy applications and services to its clients and customers. For instance, if managed network 300 provides online music streaming services, third-party networks 340 may store the music files and provide web interface and streaming capabilities. In this way, the enterprise of managed network 300 does not have to build and maintain its own servers for these operations.

Remote network management platform 320 may include modules that integrate with third-party networks 340 to expose virtual machines and managed services therein to managed network 300. The modules may allow users to request virtual resources and provide flexible reporting for third-party networks 340. In order to establish this functionality, a user from managed network 300 might first establish an account with third-party networks 340, and request a set of associated resources. Then, the user may enter the account information into the appropriate modules of remote network management platform 320. These modules may then automatically discover the manageable resources in the account, and also provide reports related to usage, performance, and billing.

Internet 350 may represent a portion of the global Internet. However, Internet 350 may alternatively represent a different type of network, such as a private wide-area or local-area packet-switched network.

Figure 4:
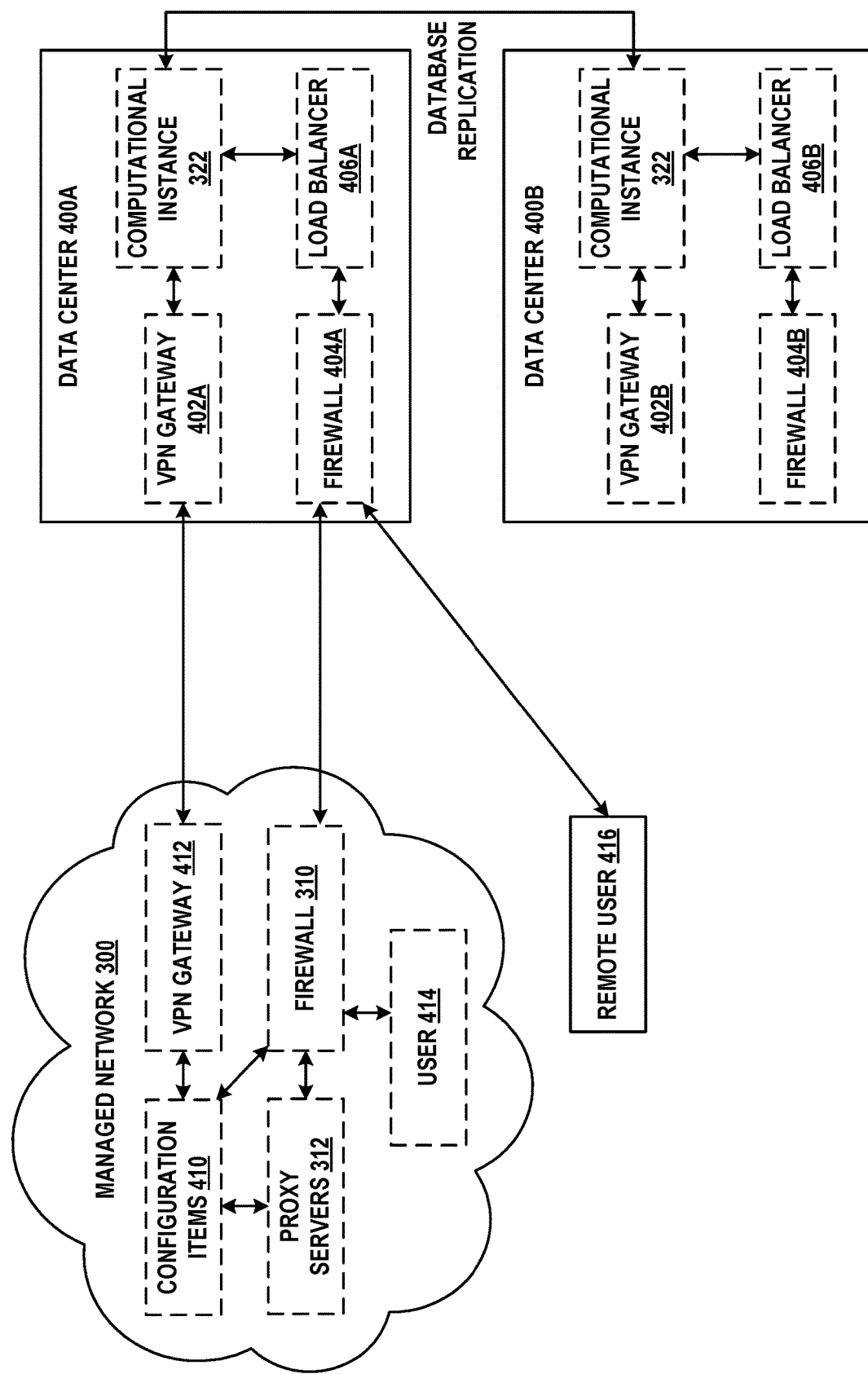
FIG. 4 depicts a communication environment involving a remote network management architecture, in accordance with example embodiments.

FIG. 4 further illustrates the communication environment between managed network 300 and computational instance 322, and introduces additional features and alternative embodiments. In FIG. 4, computational instance 322 is replicated across data centers 400A and 400B. These data centers may be geographically distant from one another, perhaps in different cities or different countries. Each data center includes support equipment that facilitates communication with managed network 300, as well as remote users.

In data center 400A, network traffic to and from external devices flows either through VPN gateway 402A or firewall 404A. VPN gateway 402A may be peered with VPN gateway 412 of managed network 300 by way of a security protocol such as Internet Protocol Security (IPSEC) or Transport Layer Security (TLS). Firewall 404A may be configured to allow access from authorized users, such as user 414 and remote user 416, and to deny access to unauthorized users. By way of firewall 404A, these users may access computational instance 322, and possibly other computational instances. Load balancer 406A may be used to distribute traffic amongst one or more physical or virtual server devices that host computational instance 322. Load balancer 406A may simplify user access by hiding the internal configuration of data center 400A, (e.g., computational instance 322) from client devices. For instance, if computational instance 322 includes multiple physical or virtual computing devices that share access to multiple databases, load balancer 406A may distribute network traffic and processing tasks across these computing devices and databases so that no one computing device or database is significantly busier than the others. In some embodiments, computational instance 322 may include VPN gateway 402A, firewall 404A, and load balancer 406A.

Data center 400B may include its own versions of the components in data center 400A. Thus, VPN gateway 402B, firewall 404B, and load balancer 406B may perform the same or similar operations as VPN gateway 402A, firewall 404A, and load balancer 406A, respectively. Further, by way of real-time or near-real-time database replication and/or other operations, computational instance 322 may exist simultaneously in data centers 400A and 400B.

Data centers 400A and 400B as shown in FIG. 4 may facilitate redundancy and high availability. In the configuration of FIG. 4, data center 400A is active and data center 400B is passive. Thus, data center 400A is serving all traffic to and from managed network 300, while the version of computational instance 322 in data center 400B is being updated in near-real-time. Other configurations, such as one in which both data centers are active, may be supported.

Should data center 400A fail in some fashion or otherwise become unavailable to users, data center 400B can take over as the active data center. For example, domain name system (DNS) servers that associate a domain name of computational instance 322 with one or more Internet Protocol (IP) addresses of data center 400A may re-associate the domain name with one or more IP addresses of data center 400B. After this re-association completes (which may take less than one second or several seconds), users may access computational instance 322 by way of data center 400B.

FIG. 4 also illustrates a possible configuration of managed network 300. As noted above, proxy servers 312 and user 414 may access computational instance 322 through firewall 310. Proxy servers 312 may also access configuration items 410. In FIG. 4, configuration items 410 may refer to any or all of client devices 302, server devices 304, routers 306, and virtual machines 308, any applications or services executing thereon, as well as relationships between devices, applications, and services. Thus, the term "configuration items" may be shorthand for any physical or virtual device, or any application or service remotely discoverable or managed by computational instance 322, or relationships between discovered devices, applications, and services. Configuration items may be represented in a configuration management database (CMDB) of computational instance 322.

As noted above, VPN gateway 412 may provide a dedicated VPN to VPN gateway 402A. Such a VPN may be helpful when there is a significant amount of traffic between managed network 300 and computational instance 322, or security policies otherwise suggest or require use of a VPN between these sites. In some embodiments, any device in managed network 300 and/or computational instance 322 that directly communicates via the VPN is assigned a public IP address. Other devices in managed network 300 and/or computational instance 322 may be assigned private IP addresses (e.g., IP addresses selected from the 10.0.0.0-10.255.255.255 or 192.168.0.0-192.168.255.255 ranges, represented in shorthand as subnets 10.0.0.0/8 and 192.168.0.0/16, respectively).

IV. Example Device, Application, and Service Discovery

In order for remote network management platform 320 to administer the devices, applications, and services of managed network 300, remote network management platform 320 may first determine what devices are present in managed network 300, the configurations and operational statuses of these devices, and the applications and services provided by the devices, and well as the relationships between discovered devices, applications, and services. As noted above, each device, application, service, and relationship may be referred to as a configuration item. The process of defining configuration items within managed network 300 is referred to as discovery, and may be facilitated at least in part by proxy servers 312.

For purpose of the embodiments herein, an "application" may refer to one or more processes, threads, programs, client modules, server modules, or any other software that executes on a device or group of devices. A "service" may refer to a high-level capability provided by multiple applications executing on one or more devices working in conjunction with one another. For example, a high-level web service may involve multiple web application server threads executing on one device and accessing information from a database application that executes on another device.

Figure 5A:
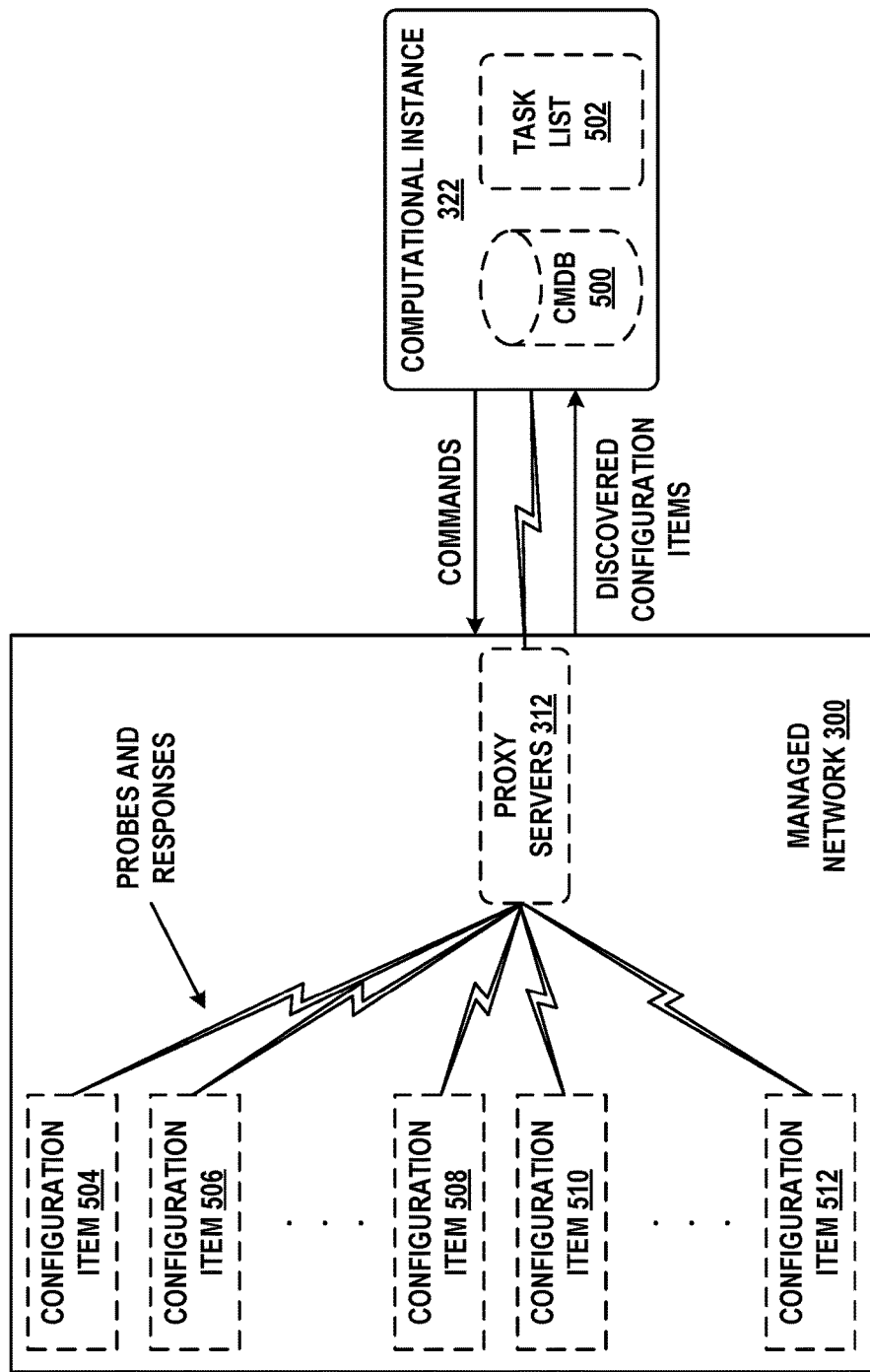
FIG. 5A depicts another communication environment involving a remote network management architecture, in accordance with example embodiments.

FIG. 5A provides a logical depiction of how configuration items can be discovered, as well as how information related to discovered configuration items can be stored. For sake of simplicity, remote network management platform 320, third-party networks 340, and Internet 350 are not shown.

In FIG. 5A, CMDB 500 and task list 502 are stored within computational instance 322. Computational instance 322 may transmit discovery commands to proxy servers 312. In response, proxy servers 312 may transmit probes to various devices, applications, and services in managed network 300. These devices, applications, and services may transmit responses to proxy servers 312, and proxy servers 312 may then provide information regarding discovered configuration items to CMDB 500 for storage therein. Configuration items stored in CMDB 500 represent the environment of managed network 300.

Task list 502 represents a list of activities that proxy servers 312 are to perform on behalf of computational instance 322. As discovery takes place, task list 502 is populated. Proxy servers 312 repeatedly query task list 502, obtain the next task therein, and perform this task until task list 502 is empty or another stopping condition has been reached.

To facilitate discovery, proxy servers 312 may be configured with information regarding one or more subnets in managed network 300 that are reachable by way of proxy servers 312. For instance, proxy servers 312 may be given the IP address range 192.168.0/24 as a subnet. Then, computational instance 322 may store this information in CMDB 500 and place tasks in task list 502 for discovery of devices at each of these addresses.

FIG. 5A also depicts devices, applications, and services in managed network 300 as configuration items 504, 506, 508, 510, and 512. As noted above, these configuration items represent a set of physical and/or virtual devices (e.g., client devices, server devices, routers, or virtual machines), applications executing thereon (e.g., web servers, email servers, databases, or storage arrays), relationships therebetween, as well as services that involve multiple individual configuration items.

Placing the tasks in task list 502 may trigger or otherwise cause proxy servers 312 to begin discovery. Alternatively or additionally, discovery may be manually triggered or automatically triggered based on triggering events (e.g., discovery may automatically begin once per day at a particular time).

In general, discovery may proceed in four logical phases: scanning, classification, identification, and exploration. Each phase of discovery involves various types of probe messages being transmitted by proxy servers 312 to one or more devices in managed network 300. The responses to these probes may be received and processed by proxy servers 312, and representations thereof may be transmitted to CMDB 500. Thus, each phase can result in more configuration items being discovered and stored in CMDB 500.

In the scanning phase, proxy servers 312 may probe each IP address in the specified range of IP addresses for open Transmission Control Protocol (TCP) and/or User Datagram Protocol (UDP) ports to determine the general type of device. The presence of such open ports at an IP address may indicate that a particular application is operating on the device that is assigned the IP address, which in turn may identify the operating system used by the device. For example, if TCP port 135 is open, then the device is likely executing a WINDOWS® operating system. Similarly, if TCP port 22 is open, then the device is likely executing a UNIX® operating system, such as LINUX®. If UDP port 161 is open, then the device may be able to be further identified through the Simple Network Management Protocol (SNMP). Other possibilities exist. Once the presence of a device at a particular IP address and its open ports have been discovered, these configuration items are saved in CMDB 500.

In the classification phase, proxy servers 312 may further probe each discovered device to determine the version of its operating system. The probes used for a particular device are based on information gathered about the devices during the scanning phase. For example, if a device is found with TCP port 22 open, a set of UNIX®-specific probes may be used. Likewise, if a device is found with TCP port 135 open, a set of WINDOWS®-specific probes may be used. For either case, an appropriate set of tasks may be placed in task list 502 for proxy servers 312 to carry out. These tasks may result in proxy servers 312 logging on, or otherwise accessing information from the particular device. For instance, if TCP port 22 is open, proxy servers 312 may be instructed to initiate a Secure Shell (SSH) connection to the particular device and obtain information about the operating system thereon from particular locations in the file system. Based on this information, the operating system may be determined. As an example, a UNIX® device with TCP port 22 open may be classified as AIX®, HPUX, LINUX®, MACOS®, or SOLARIS®. This classification information may be stored as one or more configuration items in CMDB 500.

In the identification phase, proxy servers 312 may determine specific details about a classified device. The probes used during this phase may be based on information gathered about the particular devices during the classification phase. For example, if a device was classified as LINUX®, a set of LINUX®-specific probes may be used. Likewise if a device was classified as WINDOWS® 2012, as a set of WINDOWS®-2012-specific probes may be used. As was the case for the classification phase, an appropriate set of tasks may be placed in task list 502 for proxy servers 312 to carry out. These tasks may result in proxy servers 312 reading information from the particular device, such as basic input/output system (BIOS) information, serial numbers, network interface information, media access control address(es) assigned to these network interface(s), IP address(es) used by the particular device and so on. This identification information may be stored as one or more configuration items in CMDB 500.

In the exploration phase, proxy servers 312 may determine further details about the operational state of a classified device. The probes used during this phase may be based on information gathered about the particular devices during the classification phase and/or the identification phase. Again, an appropriate set of tasks may be placed in task list 502 for proxy servers 312 to carry out. These tasks may result in proxy servers 312 reading additional information from the particular device, such as processor information, memory information, lists of running processes (applications), and so on. Once more, the discovered information may be stored as one or more configuration items in CMDB 500.

Running discovery on a network device, such as a router, may utilize SNMP. Instead of or in addition to determining a list of running processes or other application-related information, discovery may determine additional subnets known to the router and the operational state of the router's network interfaces (e.g., active, inactive, queue length, number of packets dropped, etc.). The IP addresses of the additional subnets may be candidates for further discovery procedures. Thus, discovery may progress iteratively or recursively.

Once discovery completes, a snapshot representation of each discovered device, application, and service is available in CMDB 500. For example, after discovery, operating system version, hardware configuration and network configuration details for client devices, server devices, and routers in managed network 300, as well as applications executing thereon, may be stored. This collected information may be presented to a user in various ways to allow the user to view the hardware composition and operational status of devices, as well as the characteristics of services that span multiple devices and applications.

Furthermore, CMDB 500 may include entries regarding dependencies and relationships between configuration items. More specifically, an application that is executing on a particular server device, as well as the services that rely on this application, may be represented as such in CMDB 500. For instance, suppose that a database application is executing on a server device, and that this database application is used by a new employee onboarding service as well as a payroll service. Thus, if the server device is taken out of operation for maintenance, it is clear that the employee onboarding service and payroll service will be impacted. Likewise, the dependencies and relationships between configuration items may be able to represent the services impacted when a particular router fails.

In general, dependencies and relationships between configuration items be displayed on a web-based interface and represented in a hierarchical fashion. Thus, adding, changing, or removing such dependencies and relationships may be accomplished by way of this interface.

Furthermore, users from managed network 300 may develop workflows that allow certain coordinated activities to take place across multiple discovered devices. For instance, an IT workflow might allow the user to change the common administrator password to all discovered LINUX® devices in single operation.

In order for discovery to take place in the manner described above, proxy servers 312, CMDB 500, and/or one or more credential stores may be configured with credentials for one or more of the devices to be discovered. Credentials may include any type of information needed in order to access the devices. These may include userid/password pairs, certificates, and so on. In some embodiments, these credentials may be stored in encrypted fields of CMDB 500. Proxy servers 312 may contain the decryption key for the credentials so that proxy servers 312 can use these credentials to log on to or otherwise access devices being discovered.

Figure 5B:
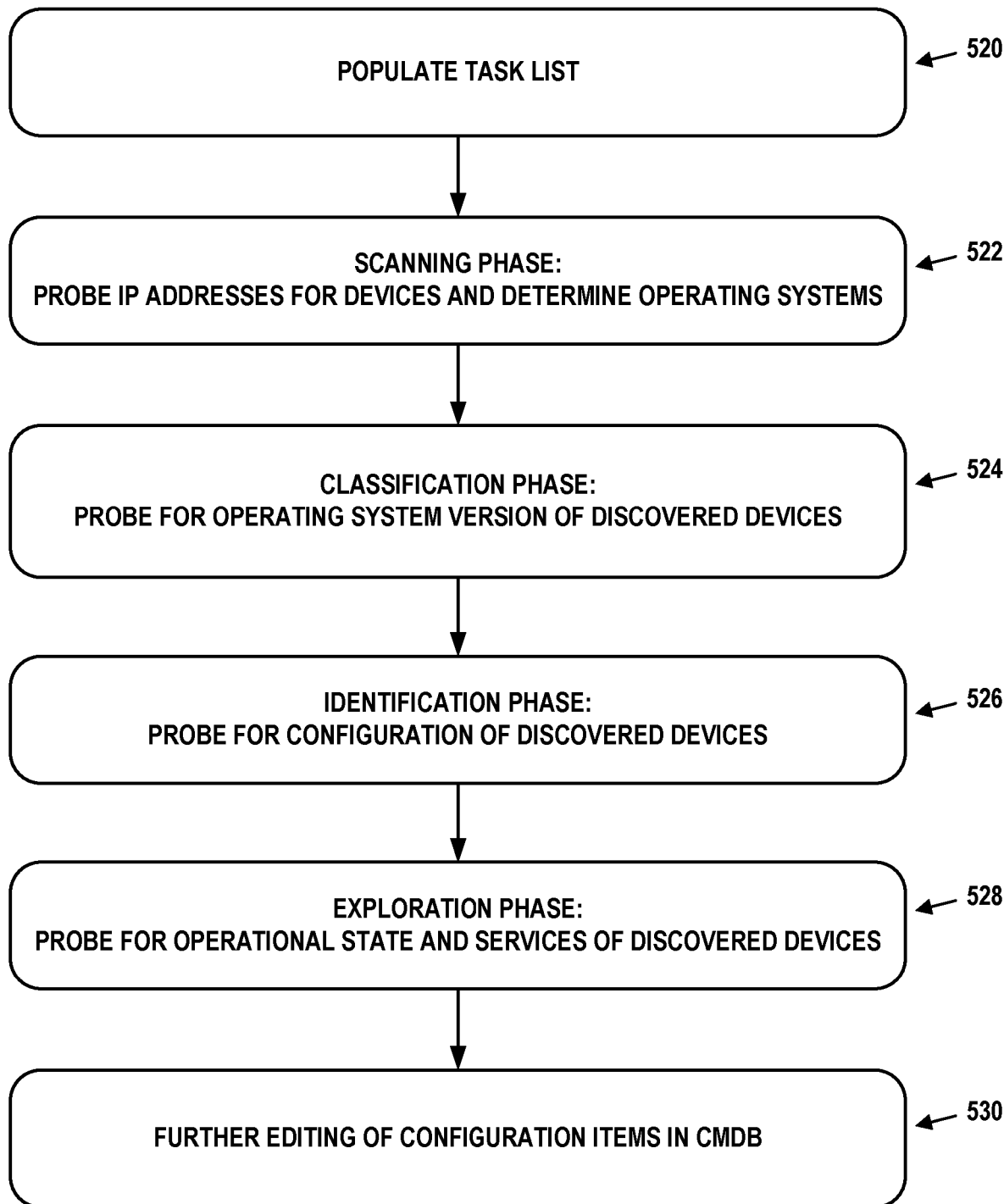
FIG. 5B is a flow chart, in accordance with example embodiments.

The discovery process is depicted as a flow chart in FIG. 5B. At block 520, the task list in the computational instance is populated, for instance, with a range of IP addresses. At block 522, the scanning phase takes place. Thus, the proxy servers probe the IP addresses for devices using these IP addresses, and attempt to determine the operating systems that are executing on these devices. At block 524, the classification phase takes place. The proxy servers attempt to determine the operating system version of the discovered devices. At block 526, the identification phase takes place. The proxy servers attempt to determine the hardware and/or software configuration of the discovered devices. At block 528, the exploration phase takes place. The proxy servers attempt to determine the operational state and applications executing on the discovered devices. At block 530, further editing of the configuration items representing the discovered devices and applications may take place. This editing may be automated and/or manual in nature.

The blocks represented in FIG. 5B are for purpose of example. Discovery may be a highly configurable procedure that can have more or fewer phases, and the operations of each phase may vary. In some cases, one or more phases may be customized, or may otherwise deviate from the exemplary descriptions above.

V. Example User Assistance Operations

As noted above, in a scenario where an agent is tasked with assisting a user associated with a managed network (such as when an agent of an enterprise is assisting a customer of the enterprise), the agent may encounter various issues when providing assistance. For example, the system that the agent uses to provide assistance may require the agent to open multiple GUI windows, such as a first window in which the agent converses (e.g., textual communication, such as instant messaging or Short Message Service (SMS)) with the user and a second window in which the agent views an incident record that summarizes the issue with which the agent is assisting the user. Additionally or alternatively, the incident record may be lengthy and/or may contain complex information, which may impede the agent's ability to efficiently assist the user. Additionally or alternatively, the system may require or encourage the agent to manually enter the entirety of response messages to the user, which may involve the agent spending time typing out lengthy portions of information from the incident record and/or repeatedly copy/pasting information from the incident record window to the conversation window.

Accordingly, the present disclosure provides an improved user assistance system that can address these and/or other issues. Such a system may provide both the incident record and a chat interface in a single GUI window and employ various methods for streamlining management of user assistance.

These and other improvements are described in more detail below, though it should be understood that the operations described below are for purposes of example. Systems relating to user assistance may provide other improvements as well.

In some embodiments, an enterprise may operate the user assistance system (e.g., manage incident records and conversations with users associated with the managed network) to provide the enterprise's services to users. However, in other embodiments, the enterprise may operate the user assistance system on behalf of a client or another entity to facilitate that client's processes and provide that client's services to users. Further, in other embodiments, the enterprise may operate the user assistance system to provide to users both the enterprise's services and client's services, either separately, or as an integration of both services. The client may also operate the user assistance system, in some instances. In any event, for brevity's sake, the term "enterprise" may refer herein to an enterprise and/or a client of the enterprise. Furthermore, any individual (e.g., of the enterprise and/or client of the enterprise) that operates the user assistance system on behalf of the enterprise to provide assistance to users may be referred to herein as an "agent."

In some embodiments, the user assistance system described herein may take the form of a software application installed on remote network management platform 320. Through this software application, an agent that is using remote network management platform 320 may be able to provide assistance to users. Accordingly, for the purposes of discussion, computational instance 322 may represent this software application, and thus, the terms "user assistance system" and "computational instance 322" may be used interchangeably to refer to the user assistance system of the present disclosure. It should be understood, however, that such a user assistance system could take other forms and in practice computational instance 322 may also support other applications.

In line with the discussion above, when a user of managed network 300 requests assistance with a particular task, a corresponding incident record may be generated and stored at a database accessible by the user assistance system. Such a record may also be referred to as an "incident" in the context of the present disclosure. Incidents can take various forms. For example, an internal user of the enterprise (e.g., an employee of an enterprise) may encounter an issue with the operation of their computing device and a member of the enterprise's information technology (IT) team may be the agent tasked with resolving the issue. As another example, a customer of the enterprise may engage in a transaction with the enterprise (e.g., ordering an item) and then request assistance relating to the transaction (e.g., a request for a refund if the ordered item does not arrive or is defective). Other examples are possible as well.

The incident record can be generated in various ways. For instance, the user assistance system can be configured to autonomously generate the incident record upon receipt of certain information from the user related to the task. Additionally or alternatively, an agent or other authorized administrator may generate the incident record either manually or with the help of the user assistance system. Further, upon generation of the incident record, the incident may be assigned to an agent. Through the user assistance system, the agent may then access the incident record and begin providing assistance to the user in an attempt to bring the incident to a close.

The incident record can take the form of a set of data that represents a variety of information, or "components," associated with the incident. Such components can include, for example: (i) an identifier of the user (e.g., the user's name, or a unique string of characters associated with the user), (ii) a status of the incident (e.g., open, unassigned, in progress, closed), (iii) a description of the incident (e.g., a manually, semi-autonomously, or fully-autonomously generated textual summary of the problem the user has encountered), (iv) a date/time when the incident record is created, (v) dates/times when the status of the incident or any other information of the incident record is changed, (vi) a current owner of the incident record (e.g., the agent or group of agents to which the task is assigned), (vii) a priority level for the incident (e.g., low, medium, or high), (viii) information indicating any efforts that has been made towards resolving the incident (e.g., dates/times such efforts were started and/or completed, and a description of such efforts), (ix) an incident number, and/or other possible information. This information may be textual, or may include images, sounds, videos, etc.

The user assistance system and/or the agent can update one or more of these components as progress is made in resolving the incident. For example, if an additional related issue arises while the agent is attempting to resolve the incident, the agent may update the incident record to include description of the additional issue. As another example, if the agent, user, and/or other entity performs an action in an attempt to resolve the incident, the agent, user, and/or the user assistance system may update the incident record with a description of the action. Other examples are possible as well.

In some embodiments, the user assistance system may generate and provide a single window of a GUI. The window may include multiple regions, and each region may include a particular type of information.

For example, the window may include a dialog region in which the agent can engage in a textual conversation with the user. The dialog region may include a first location for displaying at least a portion of the conversation, including messages received from the user and/or messages sent by the agent. Further, the dialog region may also include a second location for entering messages to be added to the conversation. A message from the agent to the user may be displayed at the second location for the agent's review, and the second location may include a GUI element that the agent may select to cause the message to be added to the conversation. It should be understood that, in other examples, additional or alternative types of conversations with the user are possible, such as a voice call and/or video call.

In addition, the window may include an incident record region in which the user assistance system displays the incident record, including some or all of the information noted above.

To improve efficiency and user satisfaction in resolving incidents, the user assistance system may be configured to enable the agent to quickly respond to the user with relevant information. One manner in which the user assistance system may accomplish this is by using the incident record, the conversation, and/or other factors to dynamically determine and provide for display a set of one or more suggested messages for use by the agent to add to the conversation. Therefore, while the agent is engaging in the conversation with the user, the agent may at various points in time have the option to either select a system-generated suggested message to send to the user, or manually enter a message.

To determine the set of suggested messages, the user assistance system may employ a variety of language processing elements and/or artificial intelligence (AI)-related techniques to better adapt to user and agent preferences, maintain a history of user/agent interactions and corresponding outcomes, learn user intent, behavior, emotion, and patterns, predict user actions, and thus improve the quality of suggested messages over time and enable agents to more efficiently resolve incidents. For example, the user assistance system may implement natural language processing, text mining, keyword recognition/analysis, phrase recognition/analysis, voice recognition/analysis, sentence structure recognition/analysis, introspective data model management and analytics, and/or predictive analytics, among other elements. As another example, the user assistance system may implement AI-related techniques such as sentiment analysis, semantics analysis, and/or intent analysis, among other possibilities. Further, the user assistance system may use any of the techniques described above to ascertain an understanding and meaning of specific language used by the enterprise (e.g., acronyms and terms associated with the enterprise) and by the user (e.g., shorthand) in conversations.

Figure 6:
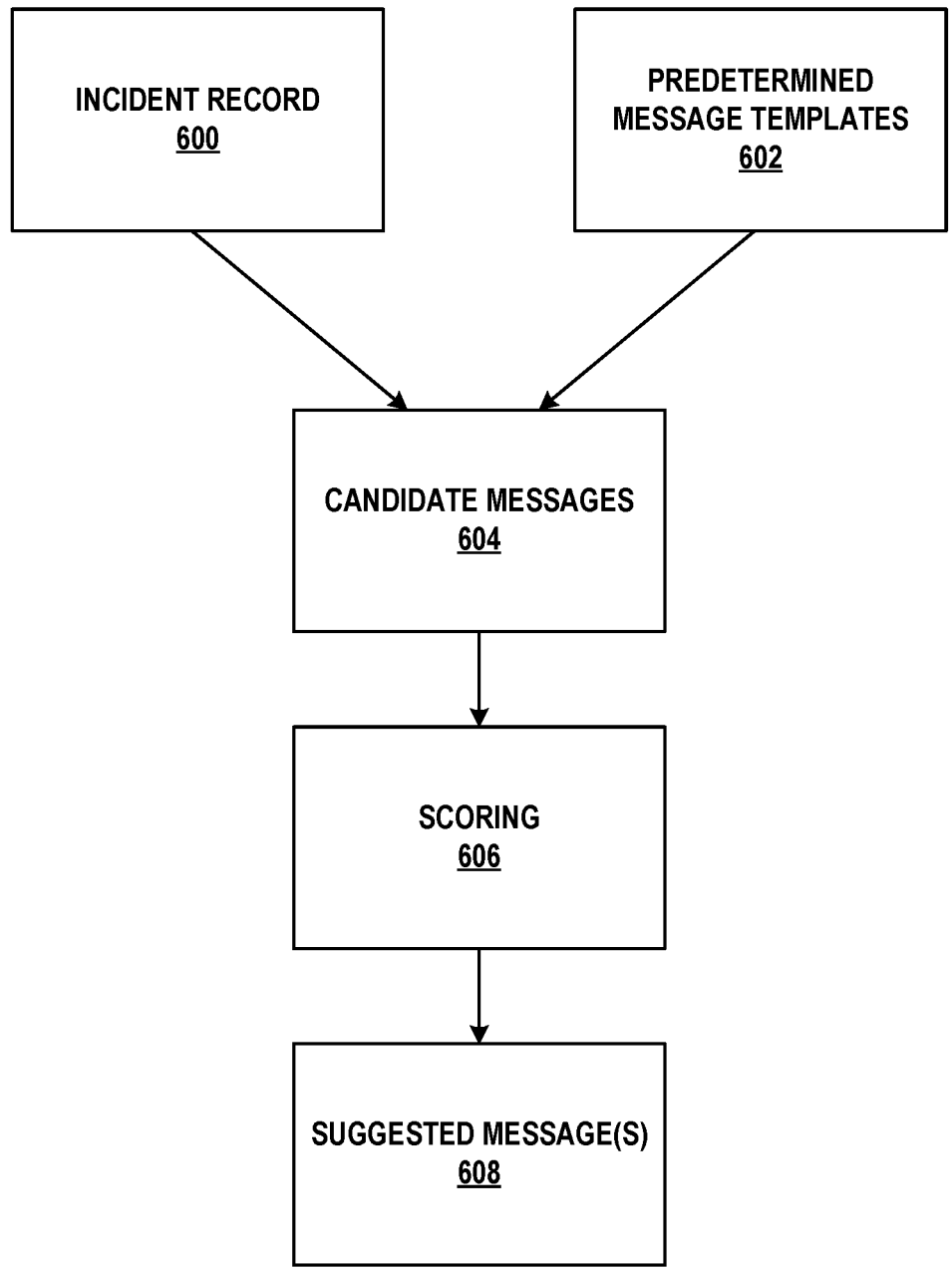
FIG. 6 illustrates a block diagram depicting a process, in accordance with example embodiments.

FIG. 6 illustrates a block diagram depicting an example process for determining the set of suggested messages. In the example process, the user assistance system may incorporate components of the incident record 600 into one or more predetermined message templates 602 in order to determine a plurality of candidate messages 604. The plurality of candidate messages 604 may then undergo scoring 606 to determine which of the candidate messages 604, if any, will be included in a final set of suggested messages 608 to be displayed for use by the agent.

In some embodiments, before the user assistance system incorporates the components of the incident record 600 into the predetermined message templates 602, the user assistance system may first identify the components that can be incorporated into the predetermined message templates 602. To facilitate this, for instance, the user assistance system may employ one or more techniques related to natural language processing. For example, the user assistance system may parse the incident record and apply one or more predetermined classifiers configured (e.g., trained) to identify the components of the incident record 600. In essence, a predetermined classifier may define, and provide to the user assistance system, which information present in the incident record 600 to identify as a component.

The components that the user assistance system identifies may include some or all of the components listed above or may include other components. In one example, for instance, the user assistance system may apply classifiers configured to identify an identifier of the user, an incident status, and an incident description. Whereas, in another example, the user assistance system may apply classifiers configured to identify only an identifier of the user and an incident description.

Herein, an "incident description" may refer to a high-level summary of the incident but may include a variety of smaller portions of information, each of which may be identified as a component. For example, in a scenario in which the incident involves a user being unable to use a particular software program installed on the user's computing device, the incident description may include information such as a name of the software program, a version number of the software program, a date/time at which the software program was last updated, and a date/time at which the user first unsuccessfully attempted to open the software program. In this example, the user assistance system may apply classifiers to identify each of these as separate components. Other examples are possible as well.

The predetermined message templates 602 may include sentence fragments and define fields in which to incorporate identified components from incident record 600. As an example, a predetermined message template may take the following form: "Hello, [USER ID], my name is [AGENT ID], and I see that [INCIDENT DESCRIPTION]." In this example, [USER ID], [AGENT ID], and [INCIDENT DESCRIPTION] are the fields that are separated by sentence fragments. The predetermined message templates 602 could take other forms as well. Further, the predetermined message templates 602 may be stored in a database accessible by the user assistance system.

As noted above, the user assistance system may incorporate the identified components of the incident record 600 into the predetermined message templates 602 to determine a plurality of candidate messages. For example, the user assistance system may identify in the incident record components including "Agent X" as an agent identifier, "User Y" as a user identifier, and "I cannot open my email application. Please help immediately." as an incident description. The user assistance system may then incorporate the components into the example template described above, resulting in the following candidate message: "Hello, User Y, my name is Agent X, and I see that you are having trouble opening your email application," where User Y may be a user identifier component, Agent X may be an agent identifier component, and information such as "having trouble opening your email application" may be a component identified and derived from the incident description. Other examples are possible as well. Furthermore, the user assistance system may employ any of a variety of natural language generation techniques to incorporate the components into the predetermined message templates 602.

In some embodiments, the user assistance system may have access to a list of predetermined candidate messages. A predetermined candidate message of the list may include no components, such as a generic message for responding to the user in which information from the incident record might not be necessary (e.g., "One moment please, I am checking the incident record."). Additionally or alternatively, a predetermined candidate message of the list may include identified components.

In some embodiments, the user assistance system may have access to stored past incident records and may refer to such past incident records as a basis for providing certain candidate messages and/or scoring candidate messages. This may occur in scenarios in which a current incident and a past incident have similar or identical users or circumstances. Such embodiments may have various advantages. For instance, the user assistance system may be configured to determine and learn over time a user's preferences, emotions, and/or circumstances surrounding repeated incidents, and may thus use past interactions with that user as a basis for determining how to help an agent interact with the user in handing a current incident. Further, different users may encounter the same incidents over time, and thus the user assistance system may be configured to learn over time how to more efficiently resolve such incidents.

In an example implementation, the user assistance system may be configured to make a comparison of the current incident record with one or more past incident records and may determine from the comparison that certain information in the current incident record is similar or identical to corresponding information in past incident records. In line with the discussion above, such information may include user identifiers, incident descriptions, etc. In response to making this determination, the user assistance system may refer to a stored record of one or more past conversations between the agent (or other agent) and the user relating to the past incident(s) and provide, as a candidate message, one of the messages of the past conversation(s). The candidate message may be a candidate message (or variation thereof) that was previously selected for inclusion in the final set of suggested messages, and perhaps additionally might be a candidate message that the agent selected to be added to the conversation. Other examples are possible as well.

Regardless, the user assistance system may score the plurality of candidate messages 604. The scoring determined for a candidate message may indicate a level of confidence in the validity of the candidate message and in how well the candidate message is tailored to best respond to the user. Further, the scoring for the candidate message can be represented in a variety of ways, such as on a scale of zero (0) to one hundred (100) or on a scale of a different range. Other representations are possible as well.

The user assistance system may score a candidate message based on a variety of factors, examples of which are described below. Based on any single factor or combination of factors, the user assistance system may determine and assign a score to the candidate message.

In some embodiments, the user assistance system may score the candidate message based on a relevance of the candidate message to one or more messages of the conversation between the agent and the user. For example, if the agent has already provided the user with a brief summary of the incident to show that the agent understands the incident, any candidate message that again includes the summary of the incident may be given a low confidence score, since it may be inefficient for the agent to repeat the summary. Other examples are possible as well.

In some embodiments, the user assistance system may assess the relevance of the candidate message based on a set of rules that define how the agent might want to respond based on a received message or messages. For example, the rules may define a particular sentence structure or particular terms that should appear in a message from the agent to the user based on a semantic analysis of one or more messages of the conversation. As another example, the rules may define paths (e.g., branches of a tree-based structure) that the conversation may follow to achieve a desired result (e.g., resolution of the incident), and the user assistance system may implement techniques such as heuristics to determine which path to follow in the conversation. As such, if the user assistance system determines that the candidate message is in line with the determined path, the user assistance system may assign the candidate message a medium or high score (e.g., between 50 and 100 on a scale of 0 to 100), whereas if the user assistance system determines that the candidate message is not in line with the determined path, the user assistance system may assign the candidate message a low score (e.g., between 0 and 25 on a scale of 0 to 100). As yet another example, the user assistance system may incorporate various AI-based technology and techniques, such as machine learning. In some embodiments, the user assistance system may use machine learning to assign a relevance score to the candidate message. For instance, the user assistance system may over time monitor various aspects of user assistance including conversation messages, agent feedback regarding suggested messages, etc., and use these aspects as a basis for making/refining various determinations of how to score candidate messages, perhaps improving the quality and relevance of such candidate messages over time.

In some embodiments, the user assistance system may score the candidate message based on a sentiment analysis of one or more messages of the conversation between the agent and the user. Sentiment analysis may involve, by way of example, identifying keywords, capitalization of letters, and/or punctuation in one or more messages received from the user and using such criteria to evaluate an emotional state of the user. By studying such conversation messages to estimate the user's emotion, the user assistance system may provide the agent with responses that may be more likely to appeal to the user. For example, if the user's most-recent message reads "I demand that you fix my problem now!!!", the user assistance system may identify the word "demand" and the use of three exclamation points as indications of the user's emotion. Using this identification, the user assistance system may assign a higher score to a candidate message that convey an apologetic tone and/or a sense of urgency (e.g., "I am very sorry, User Y. We will fix the server as soon as possible.") than to a candidate message that does not convey such a tone and/or sense of urgency (e.g., "I understand you cannot access the server. I will look into this issue and get back to you."). Other examples are possible as well.

In some embodiments, the user assistance system may score the candidate message based on agent feedback, such as an input or inputs received by the user assistance system that indicate a degree of agent approval or disapproval of the candidate message, the predetermined message template, or a suggested message associated therewith. To facilitate this, the user assistance system may store or otherwise access and obtain a history of inputs received from agents (e.g., inputs correlated to respective templates), and may refer to the history of inputs as a basis for scoring the candidate message.

In an example implementation, if the agent is provided with a suggested message and the user assistance system receives an input from the agent indicating that the agent has not selected the suggested message to be added to the conversation (e.g., an input selecting a different suggested message), the user assistance system may use this input as a basis for determining a score (e.g., may decrease the score) for candidate messages that are generated based on the same predetermined message template that was used to generate the suggested message. For instance, if the agent does not select a suggested message reading "User Y, we will get back to you shortly," the user assistance system may decrease the score for future candidate messages that are determined based on the template that reads "[USER ID], we will get back to you shortly." On the other hand, if the user assistance system receives an input from the agent indicating a selection of the suggested message to add to the conversation, the user assistance system may use this input as a basis for determining a score (e.g., may increase the score) for candidate messages that are generated based on the same predetermined message template that was used to generate the suggested message.

Further, consider a scenario in which the agent is presented with a first suggested message, "Please wait. I am looking into your problem.", and a second suggested message, "I will look into your problem and get back to you as soon as possible." In this scenario, if the agent selects the latter message over the former message, the user assistance system may increase the score for candidate messages that are based on the same predetermined message template that was used to generate the second message and may decrease the score for candidate messages that are based on the same predetermined message template that was used to generate the first message. Other examples are possible as well.

Additionally or alternatively, if the user assistance system receives an input from the agent indicating edits made by the agent to the suggested message (or even the template itself), the user assistance system may use this input as a basis for determining a score (e.g., may decrease the score) for candidate messages that are generated based on the same predetermined message template that was used to generate the suggested message. By way of example, if the agent is presented with a suggested message that reads "We have located your order.", selects the message, and then edits it to read "Great news! We have located your order and it will be on the way to you shortly!", the user assistance system may decrease the score for candidate messages that are generated based on the same predetermined message template that was used to generate the suggested message. Further, the user assistance system may additionally edit the predetermined message template (or add a new template) to include the modified text (e.g., "Great news!" and "and it will be on the way to you shortly!"). Other examples are possible as well.

In some embodiments, the user assistance system may score the candidate message based on user feedback. To facilitate this, the user assistance system may store or otherwise access and obtain a history of user feedback and may refer to the history of user feedback as a basis for scoring the candidate message. User feedback may take various forms, such as messages received from users in response to suggested messages sent by agents and/or user-submitted reviews of agent performance. In an example implementation, the user assistance system may be configured to parse one or more messages received from the user in response to a suggested message that the agent added to the conversation, such as the first message that was received from the user after the suggested message was added. Then, using natural language processing and/or other techniques, the user assistance system may evaluate the user's feedback regarding the suggested message and may score future candidate messages based on the evaluation. For example, if the agent adds a suggested message that reads "I will try and find your lost luggage and get back to you by the end of the day" and the user then responds with a message that reads "No! Find my luggage NOW! !! !", the user assistance system may determine from the user's response that the suggested message was not acceptable to the user and may thus take this into account when scoring a candidate message that has a similar or identical template as the suggested message (e.g., may decrease the score of the candidate message). On the other hand, if the user instead responds with a message that reads "Thank you very much!", the user assistance system may determine from the user's response that the suggested message was acceptable to the user and may thus take this into account when scoring a candidate message that has a similar or identical template as the suggested message (e.g., may increase the score of the candidate message). Other examples are possible as well.

Based on the scoring of the plurality of candidate messages, the user assistance system may select one or more of the candidate messages to include as the final set of suggested messages 608. The user assistance system may make this selection in various ways. For example, the user assistance system may select every candidate message that has a score that exceeds a predefined threshold (e.g., a score of 80 or higher, on a scale of 0 to 100). Additionally or alternatively, the user assistance system may select a predefined number of candidate messages, such as three or five candidate messages having the highest scores. For instance, if there are six candidate messages having scores of 25, 35, 50, 52, 75, and 90, the user assistance system may select the top three candidate messages—namely, the candidate messages having the scores of 52, 75, and 90. Other examples are possible as well.

Upon selection of the candidate message(s) to include as the final set of suggested messages 608, the user assistance system may provide the set of suggested messages 608 for display in the single window of the GUI. The single window may include a suggestion region for displaying the set of suggested messages 608 for use by the agent to add to the conversation. In some embodiments, the suggestion region may be distinct from the dialog region (e.g., a separate region, adjacent to the dialog region). In other embodiments, however, the suggestion region might be incorporated with the dialog region. For example, the user assistance system may be configured to provide the set of suggested messages in a box where the agent types messages to be sent to the user. Other examples are possible as well.

Once the final set of suggested messages 608 are provided for display, the user assistance system may receive input from the agent indicative of a selection of one of the suggested messages. In response to receiving the input, the user assistance system may add the selected suggested message to the conversation and display the selected suggested message in the location of the dialog region where the conversation appears. Alternatively, the agent may enter a different message into the dialog region.

In some embodiments, operations relating to the scoring 606 described above may additionally or alternatively be performed with respect to the predetermined message templates. For example, if the user assistance system determines, based on one or more of the factors discussed above, that the predetermined message template has a score that is lower than a predefined threshold, the user assistance system might responsively decide not to use the predetermined message template to generate a candidate message. The user assistance system could take other responsive actions as well, such as storing an indication (e.g., a flag) that the predetermined message template has a threshold low score.

Figure 7A:
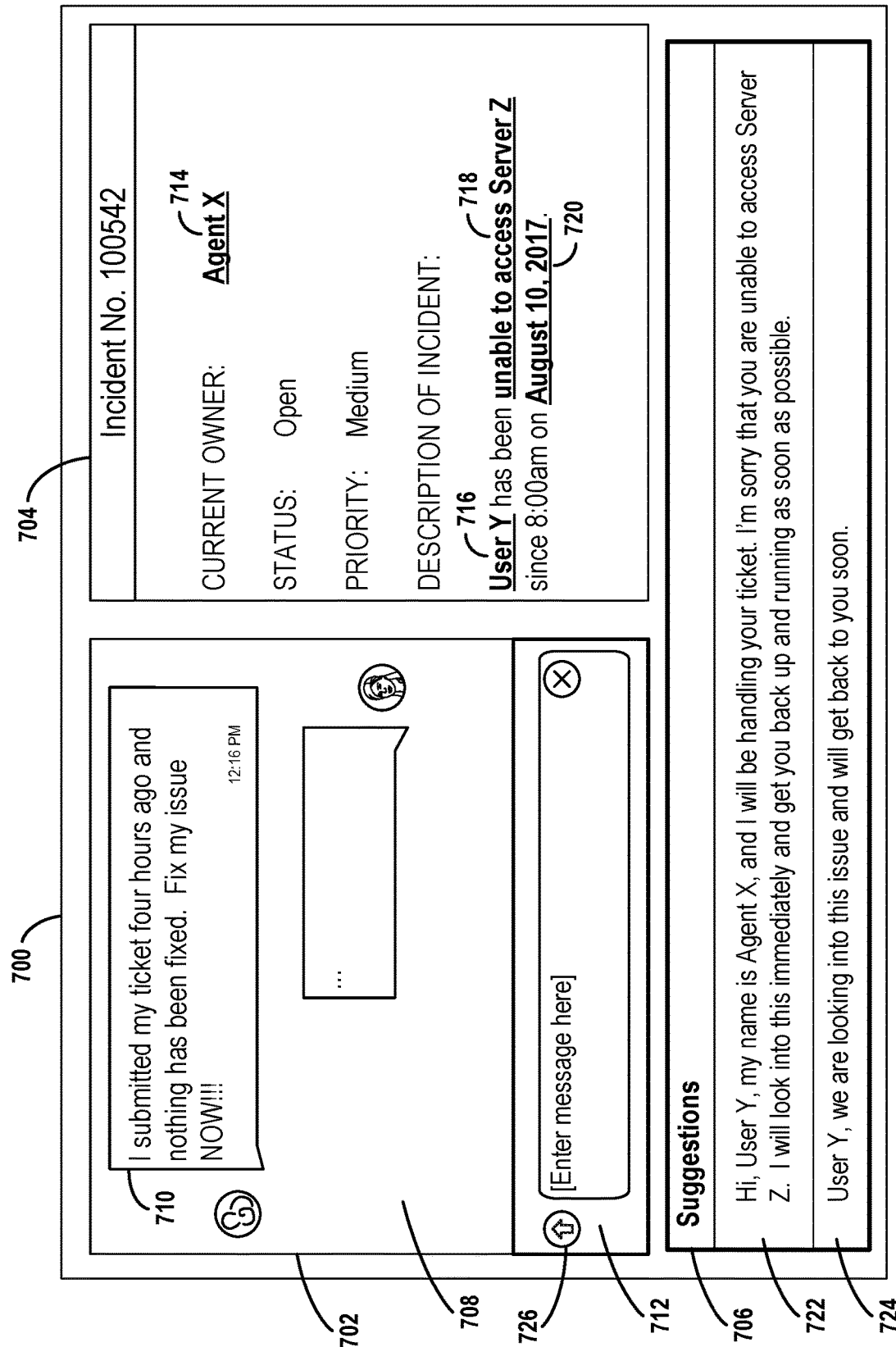
FIG. 7A illustrates a GUI, in accordance with example embodiments.

FIG. 7A illustrates an example window 700 that a computational instance of remote network management platform 320 (e.g., computational instance 322) may provide for display on a GUI. As shown, window 700 includes a dialog region 702, an incident record region 704 to the right of the dialog region 702, and a suggestion region 706 below both the dialog region 702 and the incident record region 704.

The dialog region 702 includes a first location 708 at which the conversation between the agent and the user is displayed. As shown, the agent has received a message 710 from the user that reads "I submitted my ticket four hours ago and nothing has been fixed. Fix my issue NOW! ! !" Further, the dialog region includes a second location 712 at which the agent's messages to the user appear before the agent sends them to the user.

The incident record region 704 includes an incident record. As shown, the incident record includes an incident number, a current owner of the incident (i.e., Agent X), a status of the incident (i.e., Open), a priority level of the incident (i.e., Medium), and a description of the incident (i.e., "User Y has been unable to access Server Z since 8:00 am on Aug. 10, 2017."). As further shown, various terms in the incident record are highlighted to indicate identified components. In particular, component 714 is Agent X, component 716 is User Y, component 718 is "unable to access Server Z," and component 720 is the date of Aug. 10, 2017. These components are illustrated as representative examples, and it should be understood that in other examples, more or less components may be identified.

The suggestion region 706 includes two suggested messages: suggested message 722 and suggested message 724. Each message incorporates at least one of the components. For instance, message 722 incorporates component 714, component 716, and component 718, whereas suggested message 724 incorporates only component 716. In other examples, additional suggested messages could be displayed, and the suggestion region 706 could be expanded or include a scroll bar to navigate to and view the additional suggested messages.

As shown, in comparison with suggested message 724, suggested message 722 includes more apologetic language (e.g., "I'm sorry") and indicates urgency in resolving the incident (e.g., I will look into this immediately"). In line with the discussion above, the reason for this may be because a sentiment analysis of the language of message 710 indicated that the user is frustrated. Thus, the user assistance system may have responsively scored suggested message 722 higher than suggested message 724.

Upon selection of one of the two suggested messages, the selected message may appear in the second location 712 of the dialog region 702. The agent may then select GUI element 726 to cause the user assistance system to add the selected suggested message to the conversation. This may result in the selected suggested message being transmitted to the user and displayed in location 708.

In some embodiments, the user assistance system may enable the agent to edit the selected suggested message (e.g., in location 712 and/or in suggestion region 706) before causing the selected suggested message to be added to the conversation. In such embodiments, the user assistance system may propagate edits made to the selected suggested message to the database and, based on a comparison of the original selected suggested message with the agent's edited version, change the predetermined message template that was used to create the selected suggested message. Further, the user assistance system may propagate such edits automatically, or may do so in response to the user assistance system first prompting the agent to approve the propagation of the edits. Alternatively, edits made to the selected suggested message may have no effect on the corresponding predetermined message template. Other methods could be used to update the predetermined message templates as well.

In some embodiments, the user assistance system may enable the agent to manually insert identified components into messages to send to the user, additionally or alternatively to providing the agent with a set of suggested messages. For example, the user assistance system may enable the agent to click-and-drag, double-click, or otherwise select any of the identified components, which may cause the selected component to appear in the dialog region (e.g., second location 712 of dialog region 702). To facilitate this, the user assistance system may be configured to include in the incident record region 704 a respective selectable GUI element corresponding to each component. In such embodiments, the user assistance system may highlight the selectable components or otherwise emphasize/indicate the selectable components in some other manner.

Figure 7B:
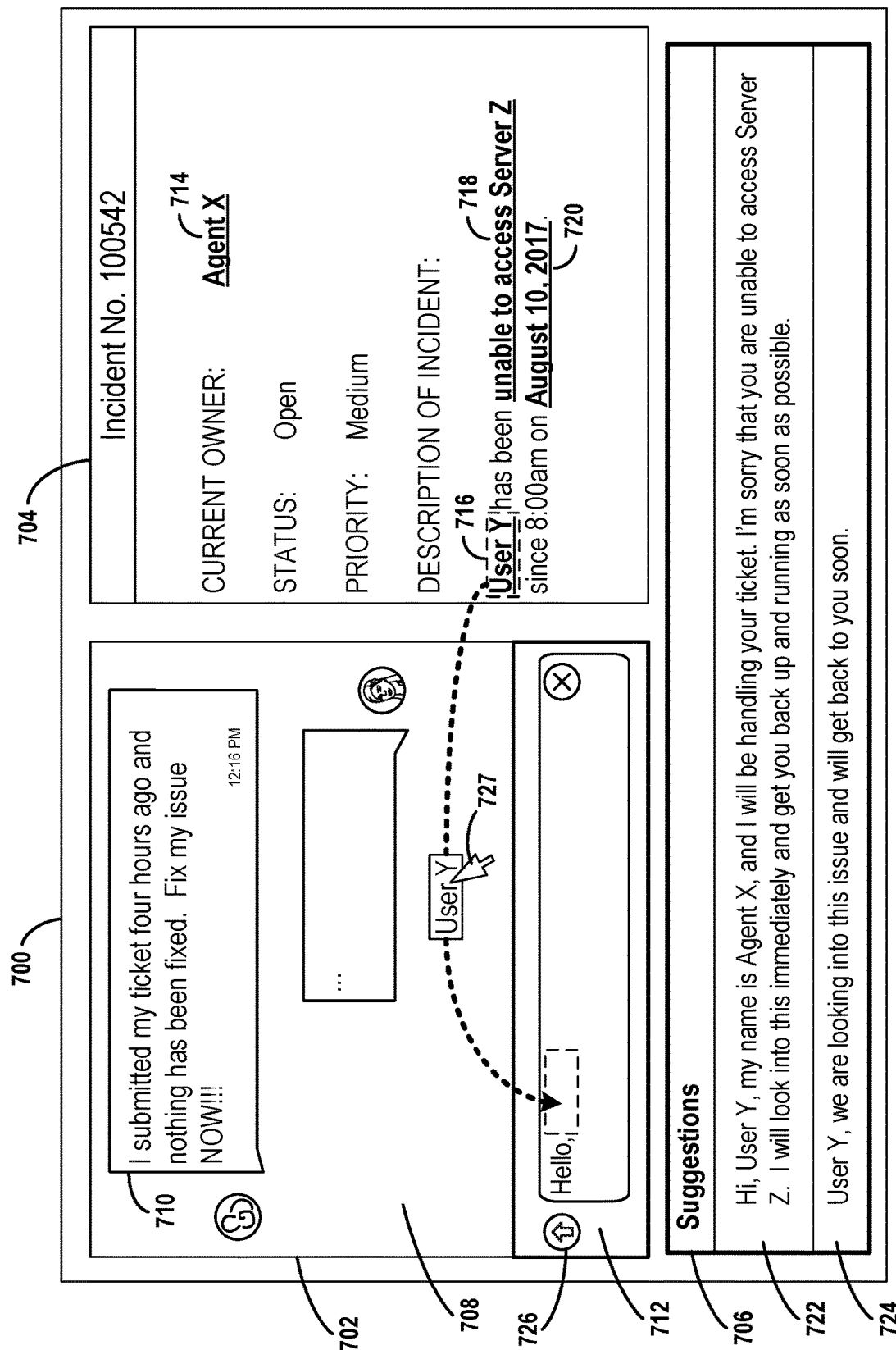
FIG. 7B illustrates a GUI, in accordance with example embodiments.

With respect to FIG. 7A, the agent may type "Hello," in location 712 and then double-click on component 716, which may cause "User Y" to appear after "Hello," and thereby display "Hello, User Y" in location 712. Additionally or alternatively, the agent may click-and-drag component 716 into location 712, which is illustrated by FIG. 7B. As shown in FIG. 7B, the agent has already selected a GUI element corresponding to component 716 and is dragging the GUI element from the incident record region 704 to location 712 to be inserted after the word "Hello." Further, FIG. 7B depicts a mouse cursor 727 being used to click-and-drag component 716, though it should be understood that other input devices may be used in other embodiments, such as a touchscreen input.

In some embodiments, the user assistance system may display one or more predetermined message templates with empty fields, and enable the agent to manually insert identified components and/or modify the message before sending it to the user.

Figure 7C:
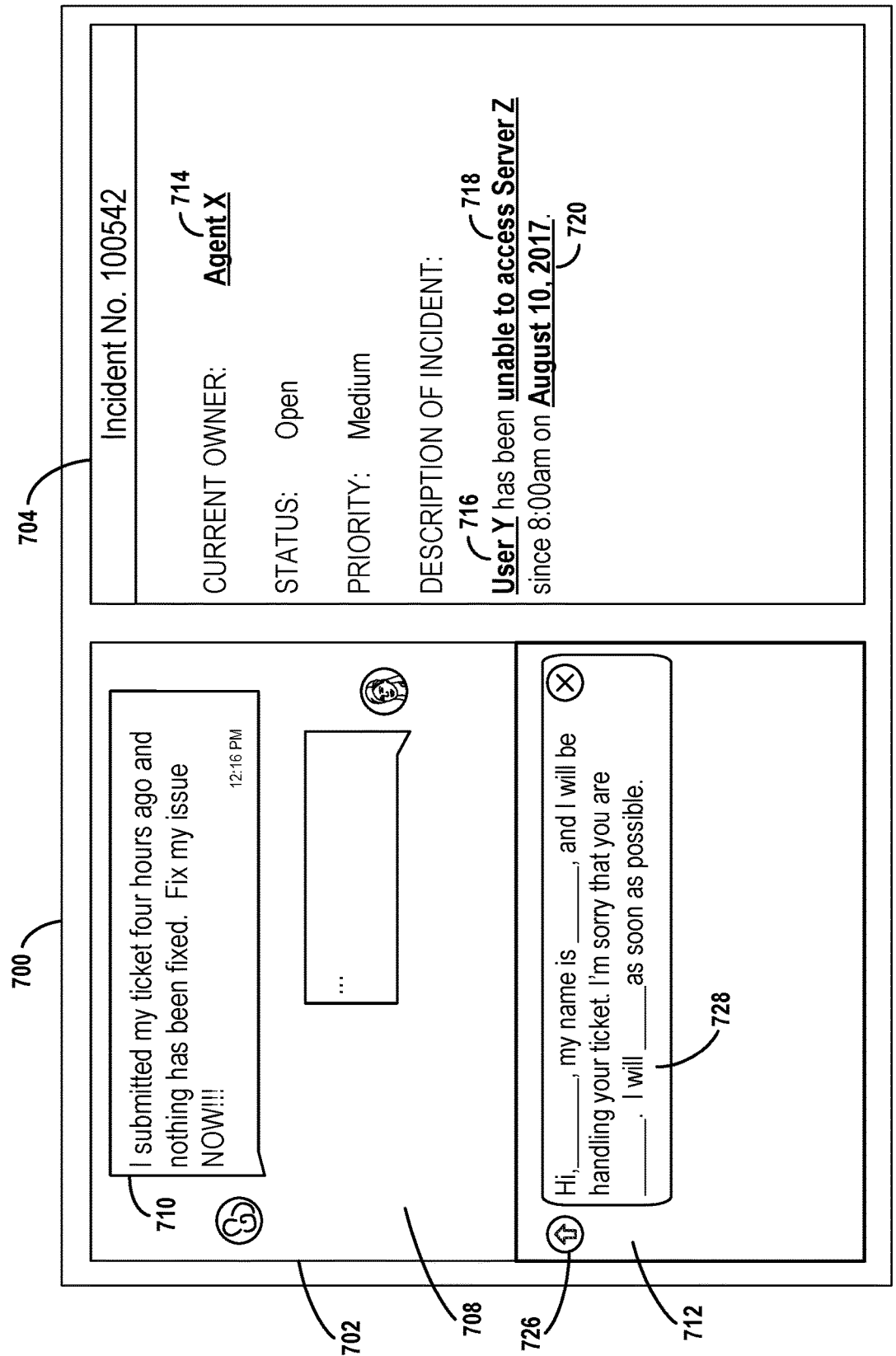
FIG. 7C illustrates a GUI, in accordance with example embodiments.

FIG. 7C illustrates a template 728 being displayed at location 712. As shown, the template 728 does not include any components from the incident record region 704. The agent may edit the text of the template 728 (i.e., add or delete text from the template). In some embodiments, editing the text of the template 728 in location 712 may have no effect on the original version of the template 728 stored in the database. In other embodiments, however, when the agent makes edits to the template 728, the user assistance system may propagate those edits to the original version of the template 728 stored in the database, perhaps in response to the user assistance system first prompting the agent to approve the propagation of the edits. As shown in FIG. 7C, the suggestion region 706 present in FIG. 7A is not included in window 700, though it may be included in other embodiments.

In some embodiments, the user assistance system may be configured such that, in response to receiving input representing a selection of a particular component in the incident record, the user assistance system may generate and display, in the dialog region, an entire suggested message that is generated based on the selected component and/or on components related to the selected component. Consider, for example, a scenario in which there is an incident record relating to a user's request for an update on the status of the user's order. The incident record may include an "Order Status" field, which may be identified as a component. Further, the incident record may include various information under the "Order Status" field, such as a shipping date/time and an anticipated date/time of arrival, each of which may or might not be identified as separate, selectable components. In this scenario, the agent may select, in the incident region, the "Order Status" component. In response, the user assistance system may display, in the dialog region (e.g., at second location 712 of dialog region 702), a suggested message that includes some or all of the order status information, such as "Thanks for checking on your order, User Y! It shipped out yesterday at 2:57 pm PST, and should be delivered this Friday by 5:00 pm PST!" In line with the discussion above, the selection may take the form of a double-click, in which case the suggested message may appear once the double-click has been made, or the selection may take the form of a click-and-drag, in which case the suggested message may appear once the selected component is dropped into the dialog region. In some examples, selection of the component may cause the user assistance system to automatically send the suggested message without further agent input. In other examples, however, the user assistance system may enable the agent to review, edit, and approve the suggested message before it is sent. Furthermore, in such embodiments, the user assistance system may perform a sentiment analysis on one or more messages received from the user, and may generate the suggested message based on the sentiment analysis. Other examples are possible as well. For instance, as opposed to selecting "Order Status" as a component, the agent may select a component included under "Order Status," which may cause the user assistance system to generate and display the same message as noted above (or perhaps a different message that is based on the selected component). For example, if "Friday" and/or "5:00 pm PST," are identified as components and either of which is selected by the agent, it may cause the same suggested message to appear, since the user assistance system might be configured to determine, based on the selection of the component, that the agent wants to provide the user with order status information.

The user assistance system may be configured to update the incident record with or without input from the agent. This may be advantageous in various scenarios, such as when there is incorrect information discovered in the incident record, when the user explicitly or implicitly expresses a desire for the incident to be resolved more quickly, and/or when events change the circumstances of the incident (e.g., efforts are made to resolve the incident, additional related incidents arise), among other possible scenarios.

In some embodiments, the user assistance system may enable the agent to select information in the incident record and update it on the fly. In particular, the user assistance system may enable the agent to select some or all information in the incident record, including any one or more components, and edit the incident record within the GUI window. In such embodiments, the user assistance system may generate and display, either in the same GUI window or in a separate window (e.g., a pop-up window), an interface in which the agent can edit the incident record and submit changes. Such embodiments may be advantageous in various scenarios, such as if there is incorrect information discovered in the incident record, or the user explicitly or implicitly expresses a desire for the incident to be resolved more quickly. For example, if during the conversation the agent receives a message from the user that includes text indicating frustration or an unexpected urgency, the agent can increase the priority level of the incident in the incident record (e.g., from Medium to High) so that the incident might be resolved faster. Other examples are possible as well.

As noted above, in some embodiments, the user assistance system may be configured to dynamically update the incident record without input from the agent. In particular, the user assistance system may be configured to parse one or more messages of the conversation identify keywords/phrases and/or perform other types of natural language processing, and responsively update the incident record. The user assistance system may be configured to identify a variety of different information, such as efforts undertaken by the agent and/or user in resolving the incident, unexpected issues that arise, and/or estimated completion times of certain tasks, among other possibilities.

Figure 7D:
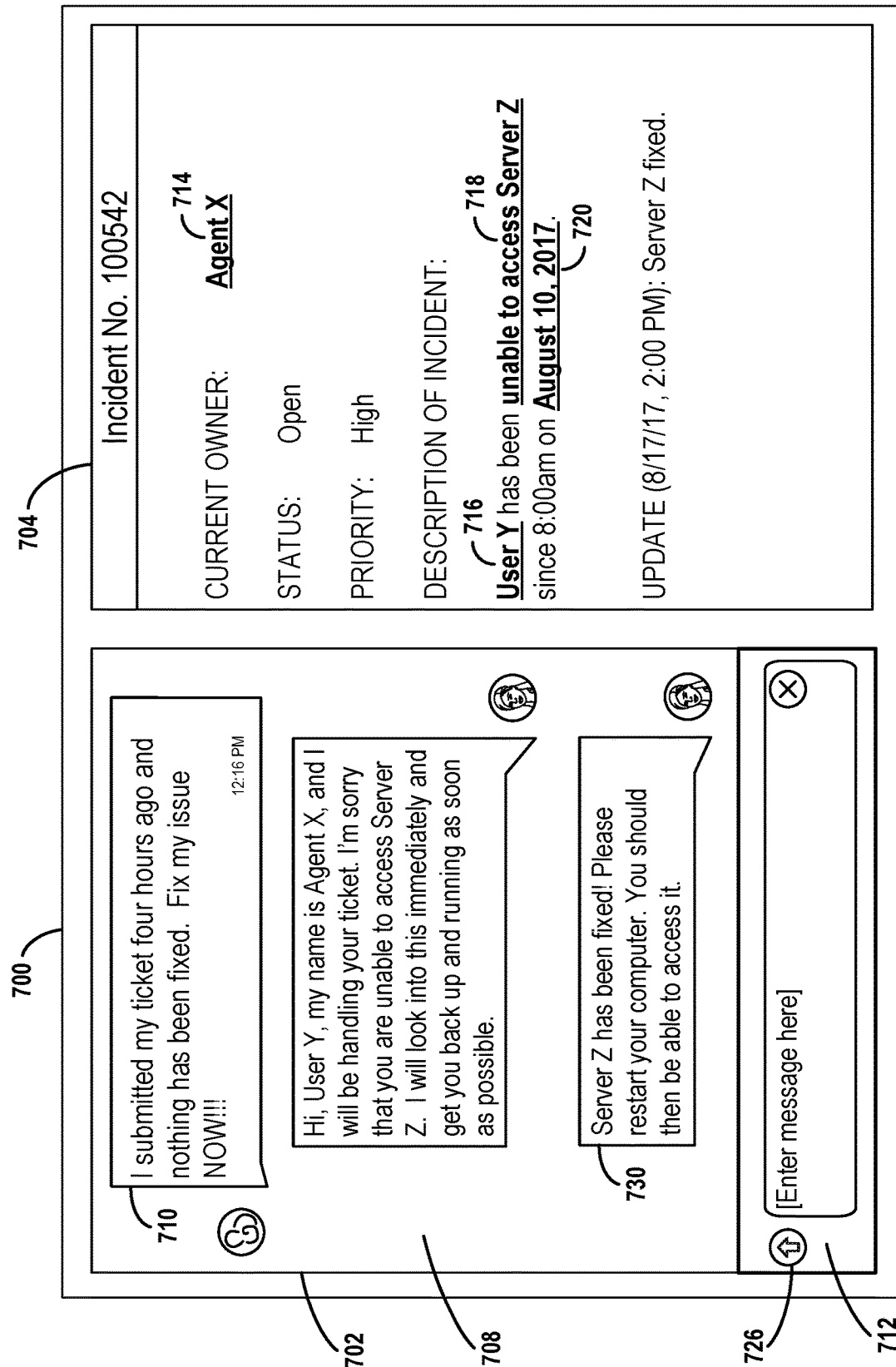
FIG. 7D illustrates a GUI, in accordance with example embodiments.
Figure 7E:
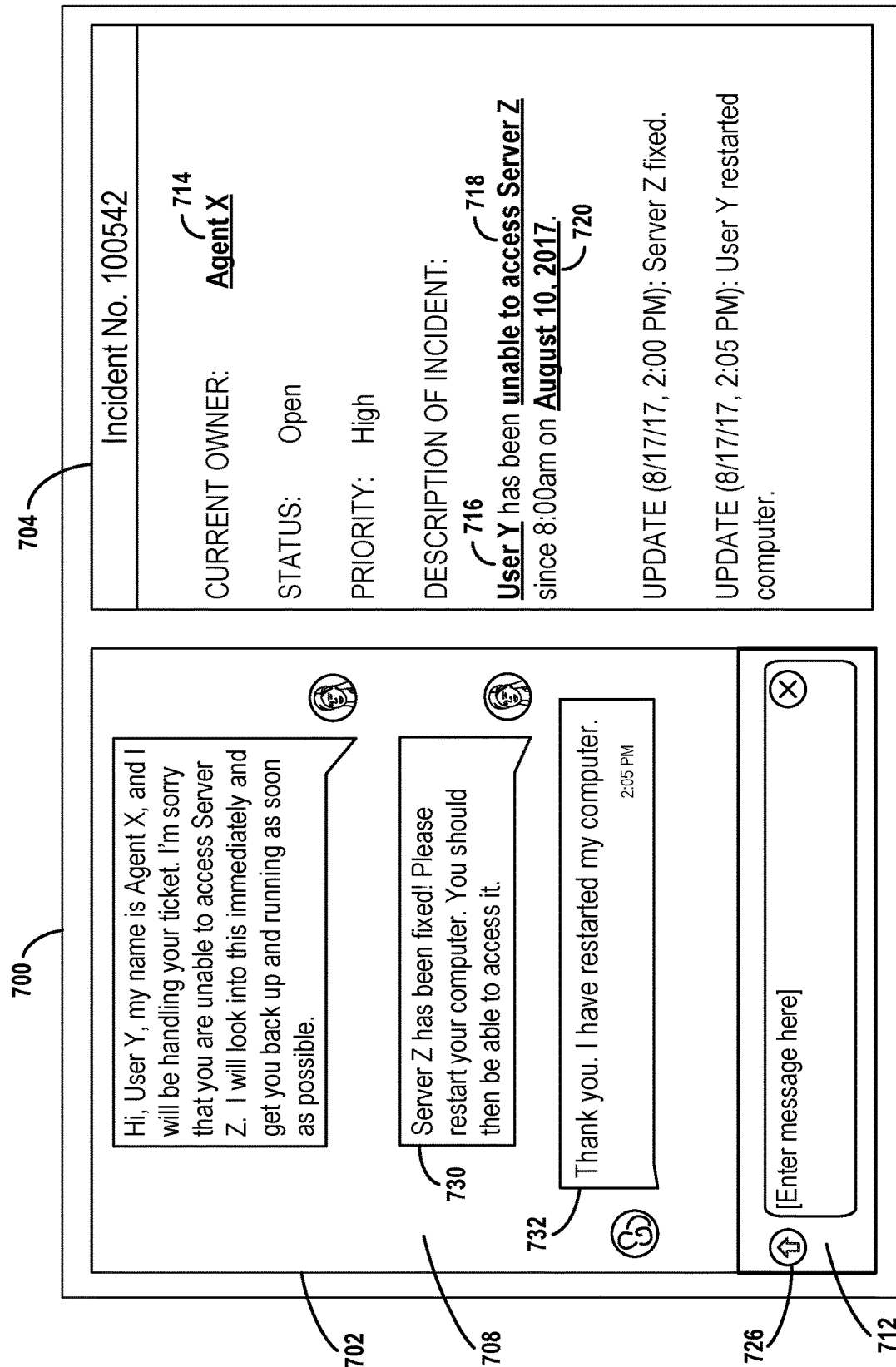
FIG. 7E illustrates a GUI, in accordance with example embodiments.

FIGS. 7D and 7E depict window 700 in an example scenario in which the user assistance system updates the incident record. As shown in FIG. 7D, location 708 of the dialog region 702 includes a message 730 from the agent to the user indicating that Server Z has been fixed and requesting that the user restart the user's computer. Further, the incident record in the incident record region 704 has been updated to reflect that Server Z was fixed, and includes a time stamp for the update to Server Z. Message 730 may be determined and selected in the manner discussed above, or in some other manner, in accordance with the present disclosure.

Next, as shown in FIG. 7E, location 708 of the dialog region 702 includes a message 732 from the user to the agent indicating that the user has restarted the user's computer. In response to receiving message 732, the user assistance system updates the incident record yet again to reflect that the user restarted the user's computer. Further, the user assistance system is configured to include a time stamp for when the restart occurred, which the user assistance system determined the time stamp to be a time at which message 732 was received. Other example scenarios for updating the incident record are possible as well.

Furthermore, in some embodiments, the user assistance system may be configured to perform a sentiment analysis of one or more messages received from the user and use the results of the sentiment analysis as a basis for updating the incident record. For example, if the user assistance system determines that the user has expressed frustration, impatience, and/or another indication of urgency with regard to the incident, the user assistance system may responsively increase the priority level of the incident in the incident record. With respect to message 710 of FIGS. 7A, 7B, and 7C, for instance, a sentiment analysis of message 710 may cause the user assistance system to change the priority of the incident from Medium to High, and the user assistance system may update the window to display the change in the incident record region 704. Conversely, if the user assistance system determines that the user is in little or no hurry for the incident to be resolved, the user assistance system may responsively lower the priority level of the incident in the incident record (e.g., from Medium to Low), or may make no changes to the priority level. Other types of natural language processing can be performed and used as a basis for updating the incident record as well.

In these and other embodiments, the user assistance system may be configured to dynamically update the set of suggested messages as the incident record changes, so that the agent can quickly notify the user of progress being made.

Example embodiments and variations of such embodiments have been described above, and it will be understood that other example embodiments and variations thereof are possible as well.

VI. Example Operations

Figure 8A:
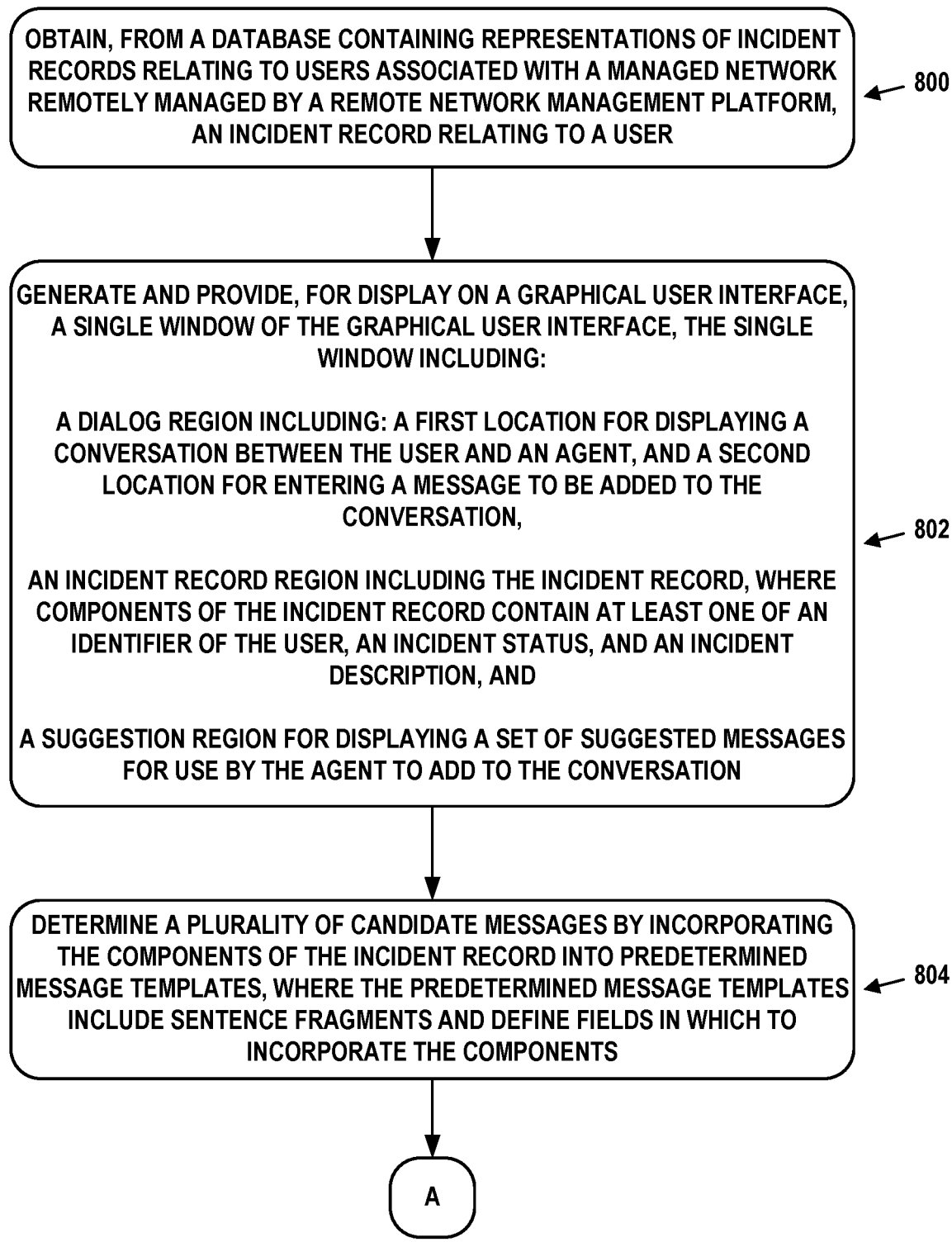
FIGS. 8A and 8B depict a flow chart, in accordance with example embodiments.
Figure 8B:
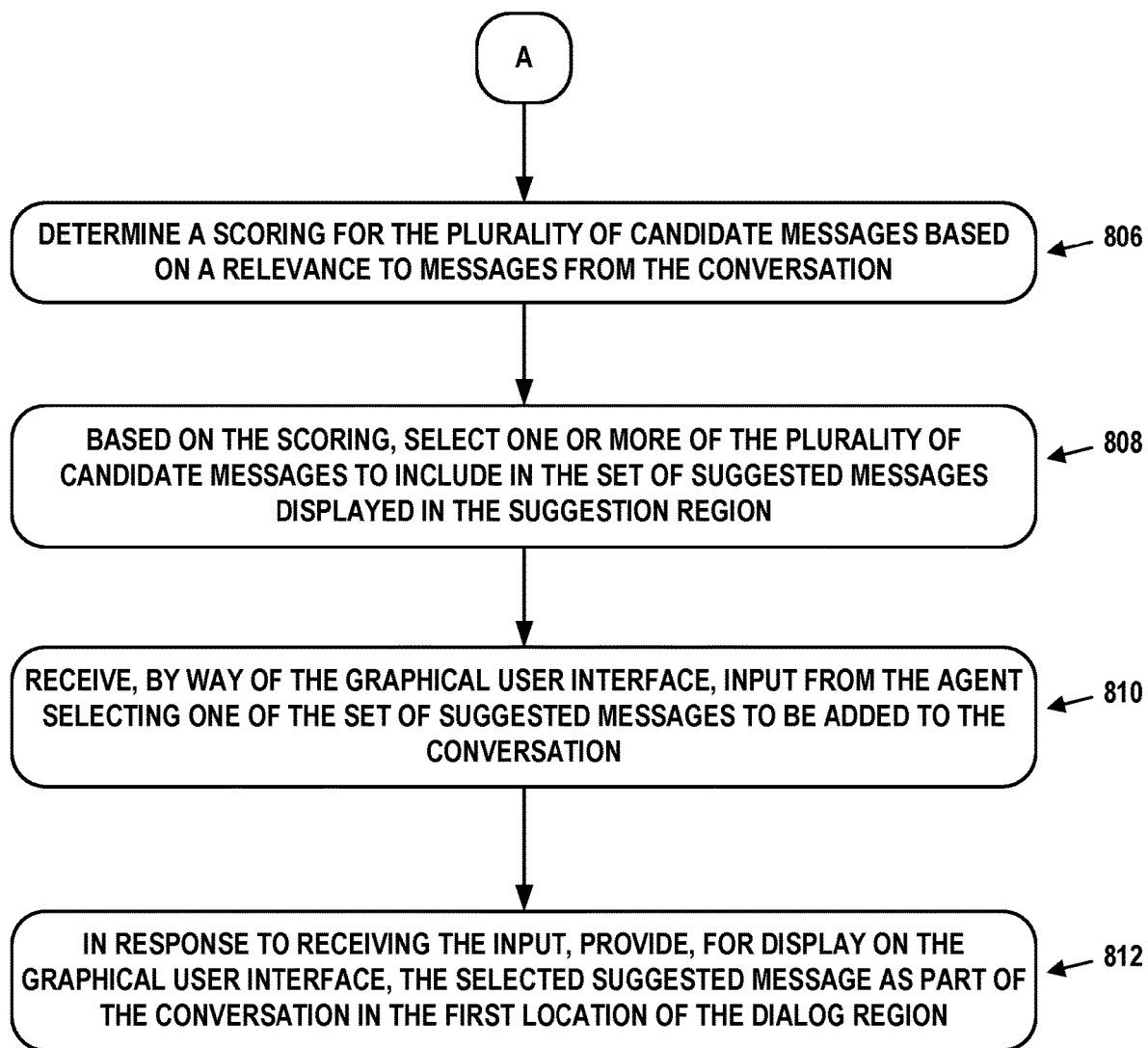

FIGS. 8A and 8B depict a flow chart illustrating an example embodiment. The process illustrated by FIGS. 8A and 8B may be carried out by a computing device, such as computing device 100, a computational instance, such as computational instance 322, and/or a cluster of computing devices, such as server cluster 200. However, the process can be carried out by other types of devices or device subsystems. For example, the process could be carried out by a portable computer, such as a laptop or a tablet device.

The embodiments of FIGS. 8A and 8B may be simplified by the removal of any one or more of the features shown therein. Further, these embodiments may be combined with features, aspects, and/or implementations of any of the previous figures or otherwise described herein.

In FIG. 8A, block 800 involves obtaining, from a database containing representations of incident records relating to users associated with a managed network remotely managed by a remote network management platform, an incident record relating to a user.

Block 802 involves generating and providing, for display on a graphical user interface, a single window of the graphical user interface, the single window including: a dialog region including: a first location for displaying a conversation between the user and an agent, and a second location for entering a message to be added to the conversation, an incident record region including the incident record, wherein components of the incident record contain at least one of an identifier of the user, an incident status, and an incident description, and a suggestion region for displaying a set of suggested messages for use by the agent to add to the conversation.

Block 804 involves determining a plurality of candidate messages by incorporating the components of the incident record into predetermined message templates, wherein the predetermined message templates include sentence fragments and define fields in which to incorporate the components.

Turning to FIG. 8B, block 806 involves determining a scoring for the plurality of candidate messages based on a relevance to messages from the conversation.

Block 808 involves based on the scoring, selecting one or more of the plurality of candidate messages to include in the set of suggested messages displayed in the suggestion region.

Block 810 involves receiving, by way of the graphical user interface, input from the agent selecting one of the set of suggested messages to be added to the conversation.

Block 812 involves in response to receiving the input, providing, for display on the graphical user interface, the selected suggested message as part of the conversation in the first location of the dialog region.

In some embodiments, the computing device may obtain, from the database, a past incident record and a past conversation related to the past incident record. The computing device may make a comparison of the incident record and the past incident record, and then, in response to the comparison indicating that at least one component of the incident record is identical to a corresponding component of the past incident record, the computing devive may determine one or more candidate messages of the plurality of candidate messages based on one or more messages from the past conversation.

In some embodiments, the computing device may perform a sentiment analysis on one or more of the messages from the conversation and determine the scoring for the plurality of candidate messages further based on the sentiment analysis.

In some embodiments, the computing device may store a history of inputs received from agents. The history of inputs may indicate agent feedback related to past suggested messages. The computing device may also determine the scoring for the plurality of candidate messages further based on the history of inputs.

In some embodiments, the computing device may store a history of messages received from users. The history of messages may indicate user feedback related to past suggested messages. The computing device may also determine the scoring for the plurality of candidate messages further based on the history of messages.

In some embodiments, the act of selecting one or more of the plurality of candidate messages to include in the set of suggested messages displayed in the suggestion region based on the scoring may involve selecting one or more of the plurality of candidate messages to include in the set of suggested messages displayed in the suggestion region based on the selected one or more candidate messages having scores that meet or exceed a predefined threshold score.

In some embodiments, before providing the selected suggested message for display on the graphical user interface as part of the conversation in the first location of the dialog region, the computing device may receive, by way of the graphical user interface, input from the agent making a modification to the selected suggested message. In such embodiments, the act of providing the selected suggested message for display on the graphical user interface as part of the conversation in the first location of the dialog region may be performed further in response to receiving the input modifying the selected suggested message and comprises providing the modified selected suggested message for display on the graphical user interface as part of the conversation in the first location of the dialog region. Further, based on the input from the agent modifying the selected suggested message, the computing device may (i) determine a new message template that includes the modification to the selected suggested message and/or (ii) update a predetermined message template corresponding to the selected suggested message to include the modification to the selected suggested message.

In some embodiments, the computing device may provide for display, on the graphical user interface, in the incident record region, selectable graphical user interface elements corresponding to the components of the incident record. The computing device may then receive, by way of the graphical user interface, input from the agent selecting one or more of the graphical user interface elements. Then, in response to receiving the input selecting one or more of the graphical user interface elements, the computing device may provide for display, on the graphical user interface, in the second location of the dialog region, components of the incident record corresponding to the selected one or more graphical user interface elements as part of a message to be added to the conversation. In such embodiments, the input from the agent selecting one or more of the graphical user interface elements may comprise a click-and-drag input moving the selected one or more of the graphical user interface elements from the incident record region to the second location of the dialog region.

In some embodiments, while the conversation between the agent and the user is ongoing, the computing device may perform natural language processing on one or more of the messages from the conversation, and, based on the natural language processing, update the incident record based on contextual information derived from the one or more messages. For instance, the components of the incident record further may contain an incident priority level, and the natural language processing may include a sentiment analysis, in which case the act of the computing device updating the incident record may involve updating the incident priority level based on the sentiment analysis.

VII. Conclusion

The present disclosure is not to be limited in terms of the particular embodiments described in this application, which are intended as illustrations of various aspects. Many modifications and variations can be made without departing from its scope, as will be apparent to those skilled in the art. Functionally equivalent methods and apparatuses within the scope of the disclosure, in addition to those described herein, will be apparent to those skilled in the art from the foregoing descriptions. Such modifications and variations are intended to fall within the scope of the appended claims.

The above detailed description describes various features and operations of the disclosed systems, devices, and methods with reference to the accompanying figures. The example embodiments described herein and in the figures are not meant to be limiting. Other embodiments can be utilized, and other changes can be made, without departing from the scope of the subject matter presented herein. It will be readily understood that the aspects of the present disclosure, as generally described herein, and illustrated in the figures, can be arranged, substituted, combined, separated, and designed in a wide variety of different configurations.

With respect to any or all of the message flow diagrams, scenarios, and flow charts in the figures and as discussed herein, each step, block, and/or communication can represent a processing of information and/or a transmission of information in accordance with example embodiments. Alternative embodiments are included within the scope of these example embodiments. In these alternative embodiments, for example, operations described as steps, blocks, transmissions, communications, requests, responses, and/or messages can be executed out of order from that shown or discussed, including substantially concurrently or in reverse order, depending on the functionality involved. Further, more or fewer blocks and/or operations can be used with any of the message flow diagrams, scenarios, and flow charts discussed herein, and these message flow diagrams, scenarios, and flow charts can be combined with one another, in part or in whole.

A step or block that represents a processing of information can correspond to circuitry that can be configured to perform the specific logical functions of a herein-described method or technique. Alternatively or additionally, a step or block that represents a processing of information can correspond to a module, a segment, or a portion of program code (including related data). The program code can include one or more instructions executable by a processor for implementing specific logical operations or actions in the method or technique. The program code and/or related data can be stored on any type of computer readable medium such as a storage device including RAM, a disk drive, a solid-state drive, or another storage medium.

The computer readable medium can also include non-transitory computer readable media such as computer readable media that store data for short periods of time like register memory and processor cache. The computer readable media can further include non-transitory computer readable media that store program code and/or data for longer periods of time. Thus, the computer readable media may include secondary or persistent long-term storage, like ROM, optical or magnetic disks, solid state drives, compact-disc read only memory (CD-ROM), for example. The computer readable media can also be any other volatile or non-volatile storage systems. A computer readable medium can be considered a computer readable storage medium, for example, or a tangible storage device.

Moreover, a step or block that represents one or more information transmissions can correspond to information transmissions between software and/or hardware modules in the same physical device. However, other information transmissions can be between software modules and/or hardware modules in different physical devices.

The particular arrangements shown in the figures should not be viewed as limiting. It should be understood that other embodiments can include more or less of each element shown in a given figure. Further, some of the illustrated elements can be combined or omitted. Yet further, an example embodiment can include elements that are not illustrated in the figures.

While various aspects and embodiments have been disclosed herein, other aspects and embodiments will be apparent to those skilled in the art. The various aspects and embodiments disclosed herein are for purpose of illustration and are not intended to be limiting, with the true scope being indicated by the following claims.

What is claimed is:

1. A non-transitory machine-readable medium comprising instructions executable by a processor, wherein the instructions comprise instructions to:
generate a graphical user interface (GUI) to be displayed on an electronic display, wherein the GUI comprises:
an incident record associated with a client; and
a dialog conversation with the client;
determine a plurality of candidate messages based at least in part on one or more message templates;
determine a confidence scoring for the each of the plurality of candidate messages based at least in part on messages of the dialog conversation and feedback from one or more previous conversations associated with the client;
select, based on the confidence scoring, one or more of the plurality of candidate messages to include in a set of one or more selectable messages;
incorporate the set of one or more selectable messages into the GUI;
receive, via the GUI, a selection of a message from the set of one or more selectable messages; and
incorporate the selected message into the dialog conversation.

2. The non-transitory medium of claim 1, wherein the instructions comprise instructions to incorporate one or more components of the incident record into the one or more message templates to form the plurality of candidate messages, wherein each of the one or more message templates comprise sentence fragments having defined fields in which to incorporate the one or more components.

3. The non-transitory medium of claim 2, wherein the plurality of candidate messages are determined based at least in part a second selection of the one or more components of the incident record.

4. The non-transitory medium of claim 1, wherein the instructions comprise instructions to transmit the selected message to a client device associated with the client.

5. The non-transitory medium of claim 1, wherein determining the confidence scoring for the each of the plurality of candidate messages based at least in part on the messages of the dialog conversation comprises sentiment analysis of the messages, semantics analysis of the messages, or intent analysis of the messages, or any combination thereof.

6. The non-transitory medium of claim 1, wherein the instructions comprise instructions to:
compare the incident record to a previous incident record associated with the client; and
in response to determining, via the comparison, that at least one component of the incident record is identical to a corresponding component of the past incident record, determine one or more candidate messages of the plurality of candidate messages based on one or more messages from a past conversation associated with the past incident record.

7. The non-transitory medium of claim 1, wherein the selection of the message from the set of one or more selectable messages is received from an agent device associated with an agent of a plurality of agents, and wherein the feedback comprises a historical data set of previous inputs received from one or more agents of the plurality of agents.

8. A method comprising:
displaying, via a graphical user interface (GUI), a dialog conversation with a client;
determining a plurality of candidate messages based at least in part on one or more message templates;
determining a confidence scoring for the each of the plurality of candidate messages based at least in part on messages of the dialog conversation and feedback from one or more previous conversations associated with the client;
selecting, based on the confidence scoring, one or more of the plurality of candidate messages to include in a set of one or more selectable messages;
displaying, via the GUI, the set of one or more selectable messages;
receiving, via the GUI, a selection of a message from the set of one or more selectable messages; and providing the selected message with the dialog conversation.

9. The method of claim 8, wherein determining the plurality of candidate messages comprises incorporating one or more components of a plurality of components associated with an incident record into the one or more message templates.

10. The method of claim 9, comprising:
receiving a modification to the selected message; and
in response to the modification, updating a message template of the one or more message templates or generating a new message template.

11. The method of claim 9, wherein the plurality of components associated with the incident record comprise:
an identifier associated with the client;
a status indicator of an incident associated with the incident record;
a description of the incident;
a time of creation of the incident record;
previous updates to the status indicator;
a priority level of the incident record; or
any combination thereof.

12. The method of claim 9, comprising:
analyzing, via natural language processing, one or more of the messages of the dialog conversation; and
based at least in part on the analysis, updating components of the incident record based on contextual information derived from the one or more messages.

13. The method of claim 8, wherein determining the confidence scoring for the each of the plurality of candidate messages based at least in part on the messages of the dialog conversation comprises sentiment analysis of the messages, semantics analysis of the messages, or intent analysis of the messages, or any combination thereof.

14. The method of claim 8, wherein determining the confidence scoring for the plurality of candidate messages comprises determining an individual confidence scoring for each candidate message of the plurality of candidate messages.

15. The method of claim 8, comprising transmitting the selected message to a client device associated with the client.

16. The method of claim 8, wherein determining the confidence scoring for the each of the plurality of candidate messages comprises determining the confidence scoring for the each of the plurality of candidate messages via a machine learning algorithm, wherein the machine learning is trained at least in part with the feedback.

17. The method of claim 8, wherein the selected one or more candidate messages comprise respective confidence scores greater than a threshold score.

18. A system comprising:
one or more processors; and
non-transitory memory comprising instructions executable by the one or more processors, wherein the instructions comprise instructions to:
generate a graphical user interface (GUI) for display on an electronic display, wherein the GUI comprises one or more selectable messages for submission in a dialog conversation, wherein the dialog conversation is associated with a particular client and an incident record, wherein generating the GUI comprising the one or more selectable messages comprises:
determining a plurality of candidate messages based at least in part on one or more message templates;
determining a confidence scoring for the each of the plurality of candidate messages based at least in part on messages of the dialog conversation and feedback from one or more previous conversations associated with the particular client; and
determining the one or more selectable messages from the plurality of candidate messages based at least in part on the confidence scoring;
receive a selection of a message of the one or more selectable messages; and
incorporate the message in the dialog conversation with the particular client.

19. The system of claim 18, wherein determining the plurality of candidate messages comprises incorporating one or more components of a plurality of components associated with the incident record into the one or more message templates, wherein determining the confidence scoring for the each of the plurality of candidate messages based at least in part on the messages of the dialog conversation comprises sentiment analysis of the messages, semantics analysis of the messages, or intent analysis of the messages, or any combination thereof.

* * * * *